(12) United States Patent
Kaneko et al.

(10) Patent No.: US 11,032,185 B2
(45) Date of Patent: Jun. 8, 2021

(54) COMMUNICATION SYSTEM, EDGE NODE, COMMUNICATION METHOD AND PROGRAM

(71) Applicant: NEC Corporation, Tokyo (JP)

(72) Inventors: Hiroya Kaneko, Tokyo (JP); Kazuya Suzuki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 118 days.

(21) Appl. No.: 16/331,187

(22) PCT Filed: Sep. 8, 2017

(86) PCT No.: PCT/JP2017/032472
§ 371 (c)(1),
(2) Date: Mar. 7, 2019

(87) PCT Pub. No.: WO2018/047943
PCT Pub. Date: Mar. 15, 2018

(65) Prior Publication Data
US 2019/0222505 A1    Jul. 18, 2019

(30) Foreign Application Priority Data
Sep. 9, 2016    (JP) .............................. JP2016-176640

(51) Int. Cl.
*H04L 12/751*    (2013.01)
*H04L 12/66*    (2006.01)
(Continued)

(52) U.S. Cl.
CPC .............. *H04L 45/08* (2013.01); *H04L 12/46* (2013.01); *H04L 12/4625* (2013.01);
(Continued)

(58) Field of Classification Search
CPC ..... H04L 12/46; H04L 12/66; H04L 12/4625; H04L 45/08; H04L 45/122; H04L 45/32; H04L 45/507; H04L 45/66
See application file for complete search history.

(56) References Cited

U.S. PATENT DOCUMENTS

2001/0030945 A1* 10/2001 Soga ....................... H04L 45/00
370/238
2006/0168316 A1* 7/2006 Kabashima ......... H04L 12/4675
709/238
(Continued)

FOREIGN PATENT DOCUMENTS

CN    103312611 A    9/2013
JP    2003-152772 A    5/2003
(Continued)

OTHER PUBLICATIONS

International Search Report for PCT Application No. PCT/JP2017/032472, dated Dec. 12, 2017.

*Primary Examiner* — Rina C Pancholi

(57) ABSTRACT

For a flooded packet transmitted from a first base to a second base connected to a transport network, a first edge node in the transport network first sets path selection information for selecting a return path for transmitting a packet from the second base to the first base, and then transmits the packet to the second base via the path configured in advance. When receiving the flooded packet, a second edge node selects the return path on the basis of the path selection information from a plurality of path candidates configured in advance between the first base and the second base and learns the path in association with information indicating the transmission source.

18 Claims, 25 Drawing Sheets

(51) Int. Cl.
　　　*H04L 12/46*　　　(2006.01)
　　　*H04L 12/733*　　(2013.01)
　　　*H04L 12/721*　　(2013.01)
　　　*H04L 12/723*　　(2013.01)

(52) U.S. Cl.
　　　CPC ............ *H04L 12/66* (2013.01); *H04L 45/122* (2013.01); *H04L 45/32* (2013.01); *H04L 45/507* (2013.01); *H04L 45/66* (2013.01)

(56) References Cited

U.S. PATENT DOCUMENTS

| | | |
|---|---|---|
| 2006/0251065 A1 | 11/2006 | Hamamoto et al. |
| 2009/0323687 A1* | 12/2009 | Nishimura .............. H04L 45/32 370/389 |
| 2013/0148666 A1* | 6/2013 | Shimonishi ............ H04L 45/72 370/400 |
| 2014/0086250 A1 | 3/2014 | Mitsumori |
| 2015/0381484 A1* | 12/2015 | Hira ................... H04L 12/4633 370/390 |

FOREIGN PATENT DOCUMENTS

| | | |
|---|---|---|
| JP | 2006-279820 A | 10/2006 |
| JP | 2010-220174 A | 9/2010 |
| JP | 2013-078087 A | 4/2013 |
| JP | 2014-072581 A | 4/2014 |
| WO | 2004/084506 A1 | 9/2004 |

\* cited by examiner

FIG. 10
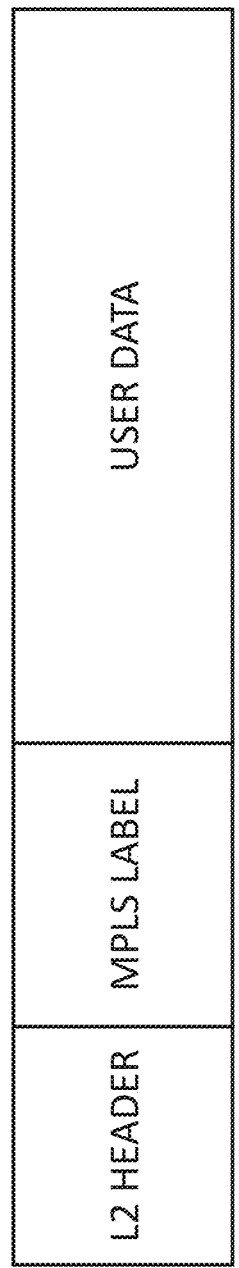
(a)
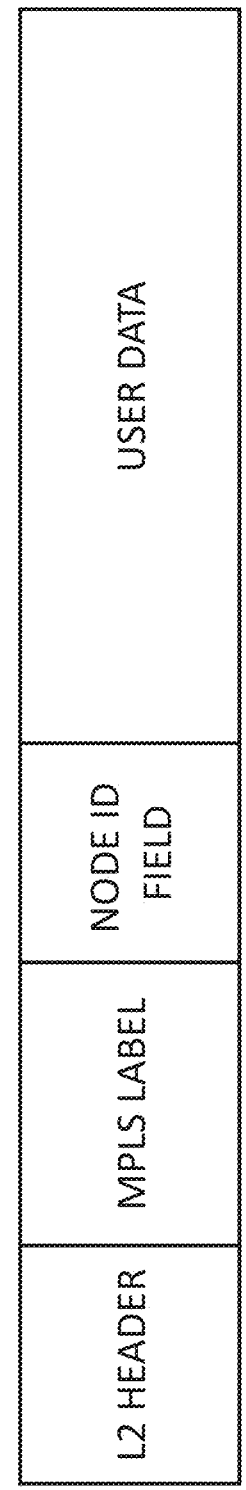
(b)

FIG. 13

| INGRESS NODE ID | RECEPTION PATH | TRANSMISSION PATH | PRIORITY |
|---|---|---|---|
| A | 310 | 311 | 1 |
| A | 330 | 331 | 2 |
| C | 340 | 321 | 1 |
| C | 350 | 341 | 2 |
| .. | .. | .. | .. |

FIG. 15

| MAC ADDRESS | PATH |
|---|---|
| A1 | 311 |
| A2 | 331 |
| : | : |

FIG. 23

| INGRESS NODE ID | RECEIVE IF | RECEPTION PATH | TRANSMISSION PATH |
|---|---|---|---|
| A | IF1 | 310 | 311 |
| A | IF2 | 330 | 331 |
| C | IF1 | 340 | 321 |
| C | IF1 | 350 | 341 |
| ‥ | | ‥ | ‥ |

FIG. 25

| INGRESS NODE ID | RECEIVE IF | RECEPTION PATH | TRANSMISSION PATH | PRIORITY |
|---|---|---|---|---|
| A | IF1 | 310 | 311 | 1 |
| A | IF2 | 330 | 331 | 2 |
| C | IF1 | 340 | 321 | 1 |
| C | IF1 | 350 | 341 | 2 |
| .. | | .. | .. | |

COMMUNICATION SYSTEM, EDGE NODE, COMMUNICATION METHOD AND PROGRAM

REFERENCE TO RELATED APPLICATION

This application is a National Stage Entry of PCT/JP2017/032472 filed on Sep. 8, 2017, which claims priority from Japanese Patent Application 2016-176640 filed on Sep. 9, 2016, the contents of all of which are incorporated herein by reference, in their entirety.

The present invention relates to a communication system, edge node, communication method and program, and particularly to a communication system, edge node, communication method and program that constitute a transport network.

FIELD

Background

Patent Literature 1 discloses a configuration that realizes address leaning, essential for layer 2 functionality, in a layer 2 virtual network utilizing MPLS (Multi-Protocol Label Switching), keeps the network load to a minimum, improves efficient band utilization of the virtual network, and realizes address learning and the load of duplicating frames at an ingress node for multicast and broadcast frames that can prevent unwanted frame duplication and frame forwarding between ingress and egress routers. More concretely, the router of Patent Literature 1 is described to comprise a determining part that determines whether or not a received lower layer frame or a received label switch frame is to be duplicated on the basis of a protocol identifier of the received lower layer frame or the received label switch frame, and a forwarding process part that passes the received lower layer frame or the received label switch frame determined not to be duplicated by the determining part while giving at least any one of a hierarchical path identifier for unicast, a hierarchical path identifier for multicast and a user identifier to the received lower layer frame or the received label switch frame determined to be duplicated by the determining part and forwarding the frame.

Patent Literature 2 discloses a configuration that enables IP (Internet Protocol) packet communication in a VPN (Virtual Private Network) without transmitting an ARP (Address Resolution Protocol) packet to resolve a MAC (Media Access Control) address. More concretely, Patent Literature 2 discloses a configuration that realizes IP communication using a NW operation device that updates a routing table of a VPN termination device and a PE (Provider Edge) device without utilizing ARP.

Patent Literatures 3 to 6 were found in the prior art search by the applicant. Patent Literature 3 discloses a relay apparatus capable of continuously performing communication even when a connecting part of a communication device, such as a personal computer, is moved in a network including the relay apparatus. Patent Literature 4 discloses such a layer 2 switch that, when the layer 2 switch receives a frame broadcast-transferred and if a destination MAC address included in the frame has already been learned and a transmission source MAC address has not been learned, the wasteful bandwidth consumption can be suppressed by transmitting from a port that has received the frame a virtual response frame supposing a response frame to be originally transmitted from a destination terminal, and discarding the virtual response frame received from a layer 2 switch located on the destination terminal side. Patent Literature 5 discloses an arrangement in which a learning upper limit number of MAC addresses is determined for each learning priority, and when the number of MAC addresses with certain priority exceeds the learning upper limit number, these MAC addresses are learned as ones with lower learning priority. Patent Literature 6 discloses a packet transmission priority processing method that transmits a packet fetched from temporarily storing means to a network line in accordance with packet transmission priority.

Patent Literature 1

International Publication Number WO2004/084506

Patent Literature 2

Japanese Patent Kokai Publication No. JP-P2013-078087A

Patent Literature 3

Japanese Patent Kokai Publication No. JP-P2010-220174A

Patent Literature 4

Japanese Patent Kokai Publication No. JP-P2006-279820A

Patent Literature 5

Japanese Patent Kokai Publication No. JP-P2014-072581A

Patent Literature 6

Japanese Patent Kokai Publication No. JP-P2003-152772A

SUMMARY

The following analysis is given by the present invention. Connecting bases (sites) such as a data center with a layer 2 network will produce many MAC addresses in a single network. An increase in MAC addresses will increase flooding traffic in order to learn frames that have not been learned, and moreover, a large amount of network resources (bandwidth (data transfer rate) and copy processing load) may be consumed as a result.

In Patent Literature 1, MAC addresses are learned using a label switch frame to which an identifier such as a hierarchical path identifier for unicast, a hierarchical path identifier for multicast, or a user identifier is given. As a result, in the method of Patent Literature 1, received frames that have passed through the same path will learn the same path. Therefore, Patent Literature 1 has a problem that traffic to a particular base (site) cannot be multipathed. This consequently implies that, even though MPLS is utilized, path selection, i.e., traffic engineering, cannot be executed, diminishing the significance of using MPLS.

It is an object of the present invention to provide a communication system, edge node, communication method and program capable of contributing to the implementation of multipathing while reducing network resource consumption in a configuration in which the bases (sites) are connected to each other by a layer 2 network.

According to a first aspect, there is provided a communication system comprising a forwarding node, provided in a transport network, that forwards a packet between bases (sites) according to a path configured in advance. The communication system further comprises a first edge node that, for a flooded packet transmitted from a first base (site) to a second base (site) connected to the transport network, first sets path selection information for selecting a return path for transmitting a packet from the second base (site) to the first base (site), and then transmits the packet to the second base (site) via the path configured in advance. The communication system further comprises a second edge node that comprises a path learning part that, when receiving the flooded packet, selects the return path on the basis of the path selection information from a plurality of path candidates configured in advance between the first base (site) and the second base (site) and learns the path in association with information indicating the transmission source, and a packet forwarding part that transmits a packet addressed to the information indicating the transmission source via the return path.

According to a second aspect, there is provided an edge node, connected to a transport network constituted by a forwarding node that forwards a packet between bases according to a path configured in advance, comprising a path learning part that, when receiving a flooded packet in which the path selection information is set, selects a return path on the basis of the path selection information for selecting a return path for transmitting a packet from a second base to a first base from a plurality of path candidates configured in advance between the first base and the second base and learns the path in association with information indicating the transmission source; and a packet forwarding part that transmits a packet addressed to the information indicating the transmission source via the return path.

According to a third aspect, there is provided a communication method including a step of causing an edge node connected to a transport network constituted by a forwarding node that forwards a packet between bases according to a path configured in advance to select a return path on the basis of path selection information for selecting the return path for transmitting a packet from a second base to a first base from a plurality of path candidates configured in advance between the first base and the second base when receiving a flooded packet in which the path selection information is set, and to learn the path in association with information indicating the transmission source; and a step of causing the edge node to transmit a packet addressed to the information indicating the transmission source via the return path. The present method is tied to a particular machine, namely, an edge node connected to a transport network.

According to a fourth aspect, there is provided a program causing a computer that constitutes an edge node connected to a transport network constituted by a forwarding node that forwards a packet between bases according to a path configured in advance to execute a process of selecting a return path on the basis of path selection information for selecting the return path for transmitting a packet from a second base to a first base from a plurality of path candidates configured in advance between the first base and the second base when receiving a flooded packet in which the path selection information is set, and of learning the path in association with information indicating the transmission source. Further, this program may be stored in a computer-readable (non-transient) storage medium. In other words, the present invention can be realized as a computer program product.

The meritorious effects of the present invention are summarized as follows. According to the present invention, it becomes possible to contribute to the implementation of multipathing while reducing network resource consumption in a configuration in which bases (sites) are connected to each other by a layer 2 network. In other words, the present invention transforms a communication system that connects bases (sites) with a layer 2 network into one in which the resource consumption thereof is improved and multipathing is implemented.

BRIEF DESCRIPTION OF DRAWINGS

FIG. 10 is a drawing showing an example of a packet structure created by the ingress router of the first exemplary embodiment of the present disclosure.

FIG. 13 is a drawing showing an example of path information held in a learning path candidate storage part of the egress router of the first exemplary embodiment of the present disclosure.

FIG. 15 is a drawing showing an example of information held in a MAC learning table of the egress router of the first exemplary embodiment of the present disclosure.

FIG. 23 is a drawing showing an example of path information held in a learning path candidate storage part of the egress router of the fifth exemplary embodiment of the present disclosure.

FIG. 25 is a drawing showing an example of path information held in a learning path candidate storage part of an egress router of a further modified exemplary embodiment of the present disclosure.

PREFERRED MODES

Figure 1:
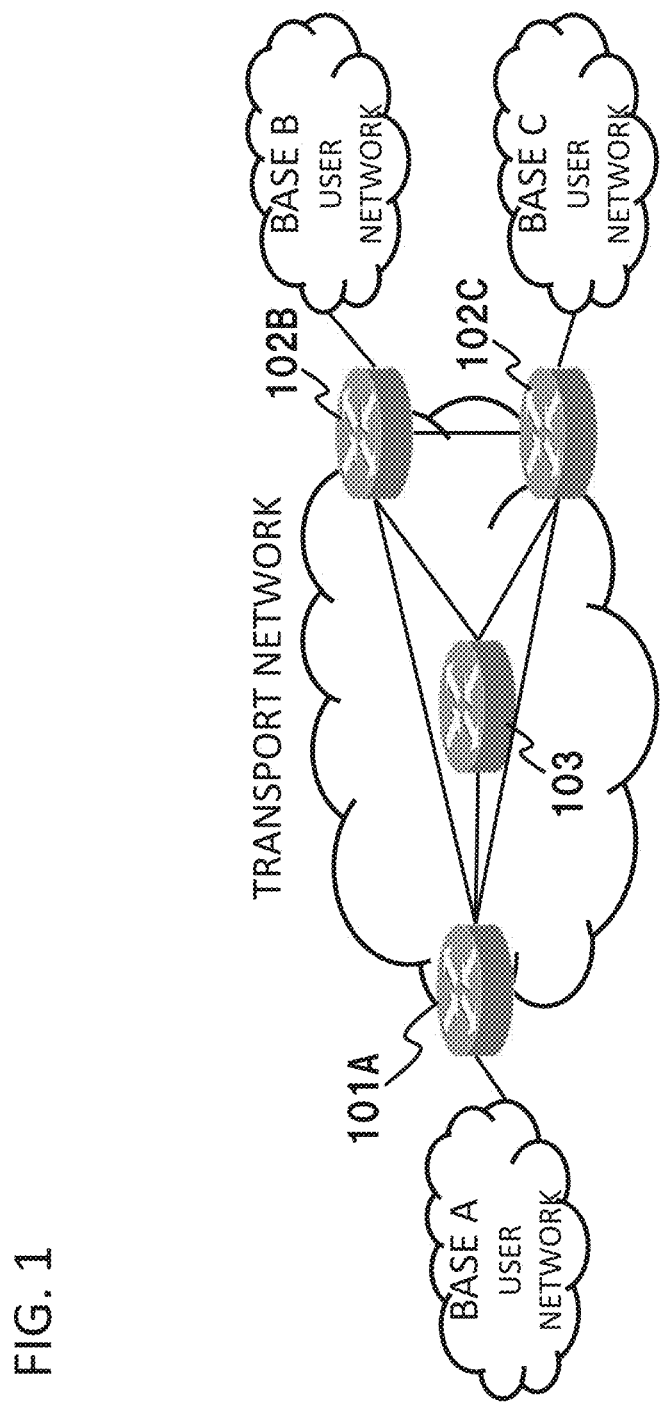
FIG. 1 is a drawing illustrating the configuration of an exemplary embodiment of the present disclosure.

First, an outline of an exemplary embodiment will be described with reference to the drawings. Note that drawing reference signs in the outline are given to each element as an example solely to facilitate understanding for convenience and are not intended to limit the present disclosure to the aspects shown in the drawings. Further, connection lines between blocks in the drawings referred to in the description below can be both bidirectional and unidirectional. Unidirectional arrows schematically indicate main flows of signals (data) and do not exclude bidirectionality.

As shown in FIG. 1, the present disclosure in an exemplary embodiment thereof can be implemented by a configuration including a forwarding node 103, provided in a transport network, that forwards a packet between bases according to a path configured in advance; a first edge node 101A that, for a flooded packet transmitted from a first base to a second base connected to the transport network, first sets path selection information for selecting a return path for transmitting a packet from the second base to the first base, and then transmits the packet to the second base via the path configured in advance; and second edge nodes 102B and 102C that learn the return path using the flooded packet received from the first edge node.

More concretely, the second edge nodes 102B and 102C comprise a path learning part that, when receiving the flooded packet, selects the return path on the basis of the path selection information from a plurality of path candidates configured in advance between the first base and the second base and learns the path in association with information indicating the transmission source, and a packet forwarding part that transmits a packet addressed to the information indicating the transmission source via the return path. Further, the path candidates may be selected by referring to a path information storage part that stores the path selection information and the plurality of path candidates configured in advance between the first base and the second base.

Figure 2:
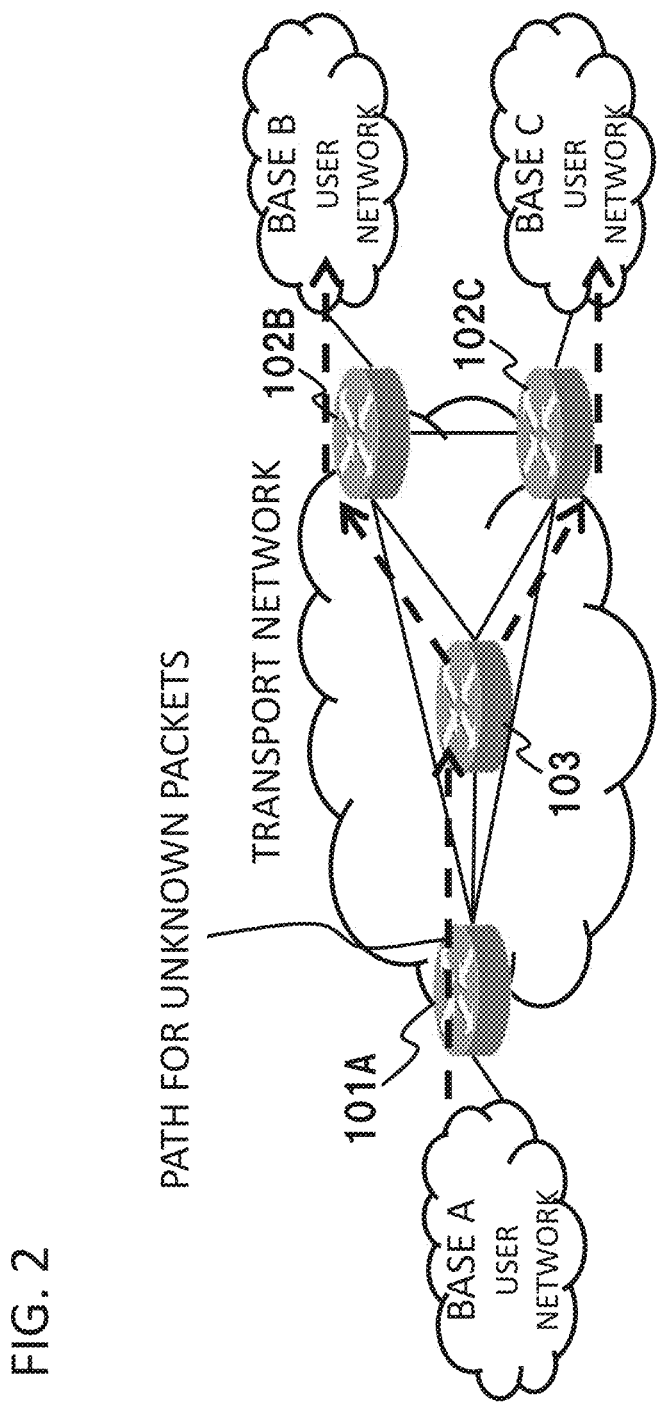
FIG. 2 is a drawing for explaining the operation of an exemplary embodiment of the present disclosure.
Figure 3:
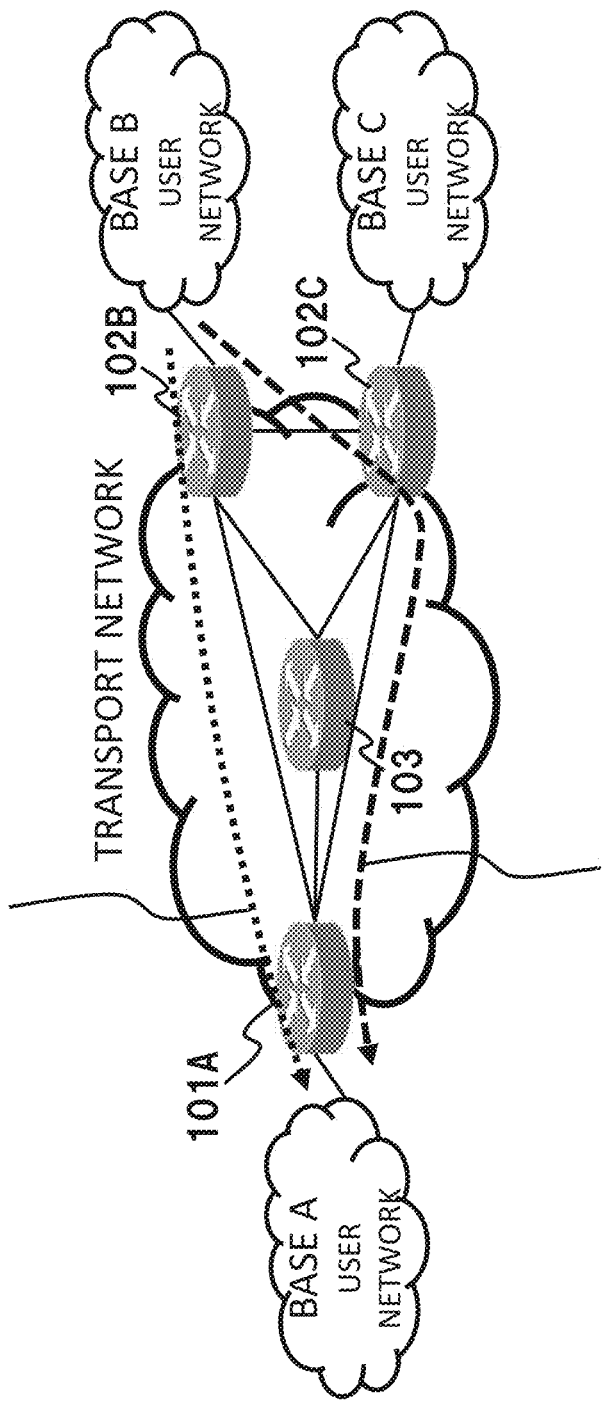
FIG. 3 is a drawing for explaining the operation of an exemplary embodiment of the present disclosure.

For instance, it is assumed that a path for unknown packets in order to forward flooded packets has been configured in the transport network, as shown in FIG. 2. Furthermore, as shown in FIG. 3, we also assume that a learning path candidate 1 through which transmission is directly made from the edge node 102B to the edge node 101A and a learning path candidate 2 through which transmission is made from the edge node 102B to the edge node 101A via the edge node 102C are set up as a plurality of path candidates for forwarding a packet from a base B to a base A. Here, "flooded packets" include unknown packets, in addition to broadcast and multicast packets. An "unknown packet" is a packet whose destination is unknown (a packet that does not have the destination thereof registered in a table for determining the forwarding destination). A separate dedicated path may be provided as a forwarding path for broadcast and multicast packets, but when a packet needs to reach all the bases, the path for unknown packets can be used.

Figure 4:
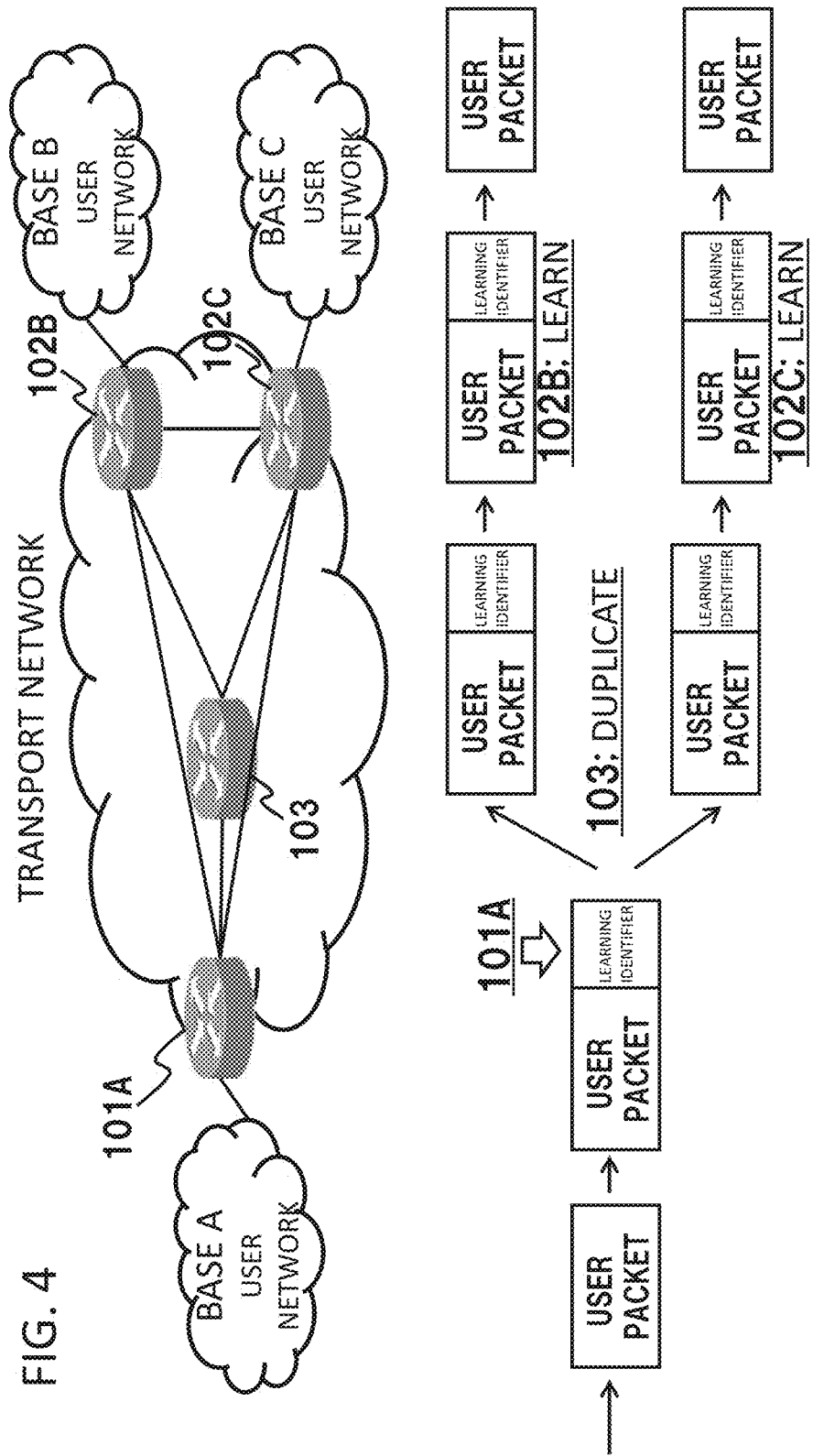
FIG. 4 is a drawing for explaining the operation of an exemplary embodiment of the present disclosure.

In a state in which the settings described above have been completed, the following operation is performed when the first edge node 101A receives a flooded packet. As shown in FIG. 4, the first edge node 101A first adds a learning identifier such as an ID of the first edge node 101A as the path selection information to the flooded packet and sends the packet to the path for unknown packets in the transport network.

The forwarding node 103 on the path for unknown packets forwards the flooded packet along the path for unknown packets. At this time, the forwarding node 103 duplicates the flooded packet as necessary.

When the flooded packet reaches the second edge node 102B (102C), the second edge node 102B (102C) learns a return path using the ID (learning identifier) of the first edge node 101A added to the flooded packet as the path selection information.

Figure 5:
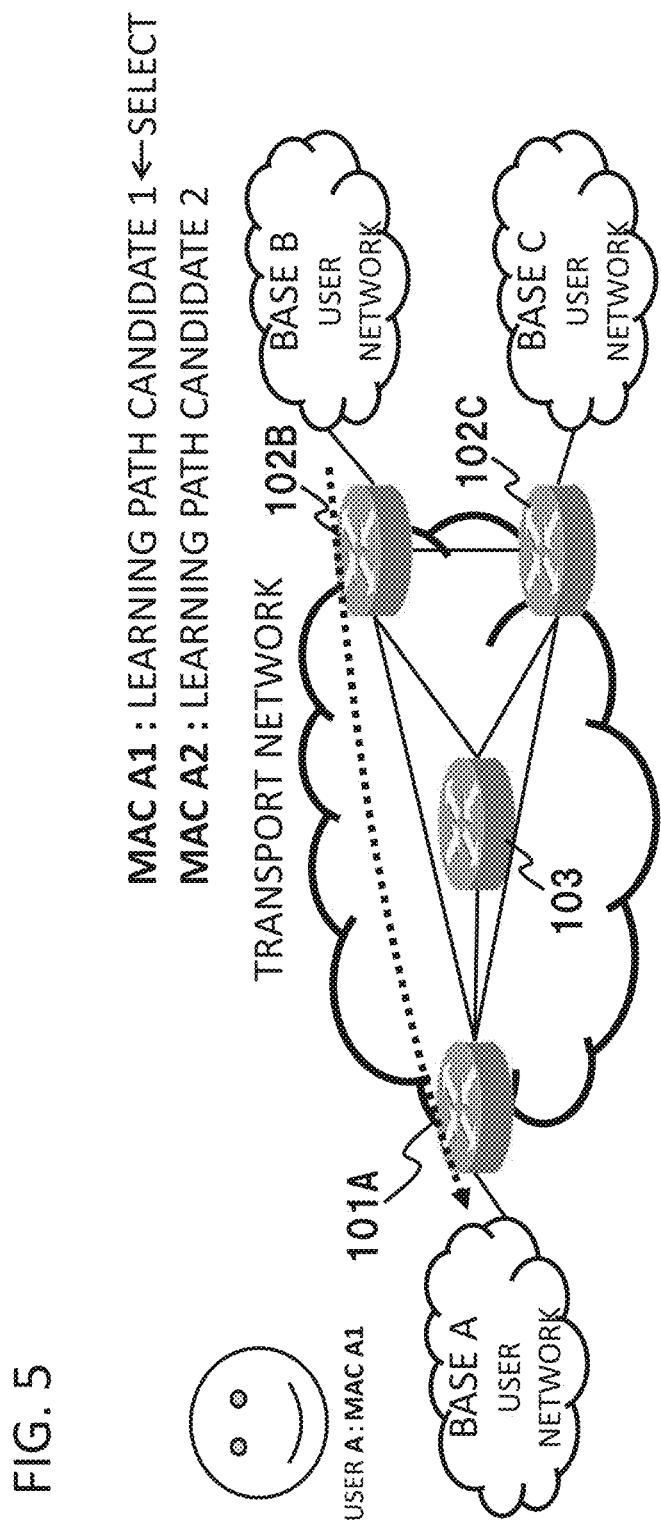
FIG. 5 is a drawing for explaining the operation of an exemplary embodiment of the present disclosure.
Figure 6:
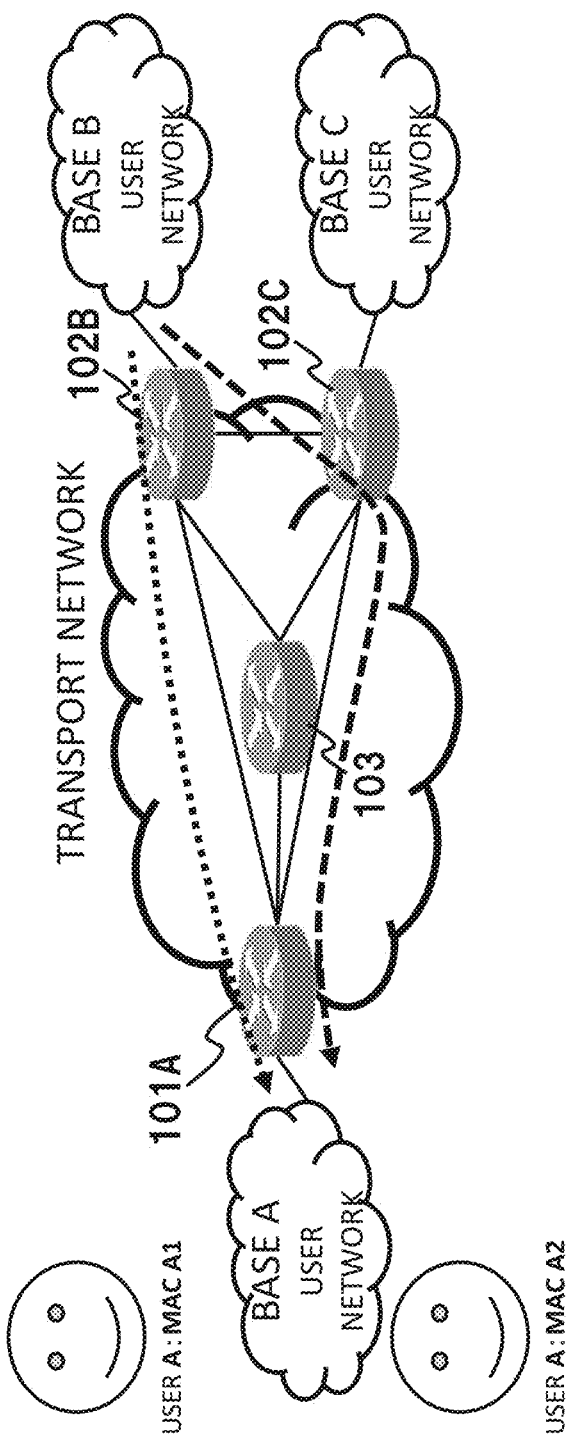
FIG. 6 is a drawing for explaining the operation of an exemplary embodiment of the present disclosure.

More concretely, the second edge node 102B (102C) selects a single path from learning path candidates, stored in the path information storage part, that match the path selection information added to the flooded packet, and learns the path in association with the information indicating the transmission source. For instance, as shown in FIG. 5, let us assume that user A1, a user at the base A, starts new communication destined for the base B. The second edge node 102B (102C) selects the learning path candidate 1 in accordance with the information (learning identifier) indicating the transmission source added by the first edge node 101A, and learns the path in association with the MAC address of the user A1. Then, for instance, another user A2 at the base A starts new communication destined for the base B, as shown in FIG. 6. The second edge node 102B (102C) selects the learning path candidate 2 in accordance with the information (learning identifier) indicating the transmission source added by the first edge node 101A, and learns the path in association with the MAC address of the user A2. As a result, if the second node receives a packet destined for the user A1 or A2 from the base B thereafter, the second nodes will select a return path according to the MAC address thereof.

As described above, according to the present disclosure, it becomes possible to configure different return paths for packets from the same base. The reason for this is that a plurality of return paths are prepared as path candidates and the second edge node 102B (102C) is able to select a return path according to an appropriate rule. Further, as evident from the description above, since a flooded packet does not necessarily have to be copied by an edge node on the ingress side in the present disclosure, it becomes possible to prevent wasteful copying and forwarding of packets between edge routers. Further, since it is possible to configure different return paths for packets from the same base as stated above, the present disclosure can be utilized for traffic engineering.

First Exemplary Embodiment

Figure 7:
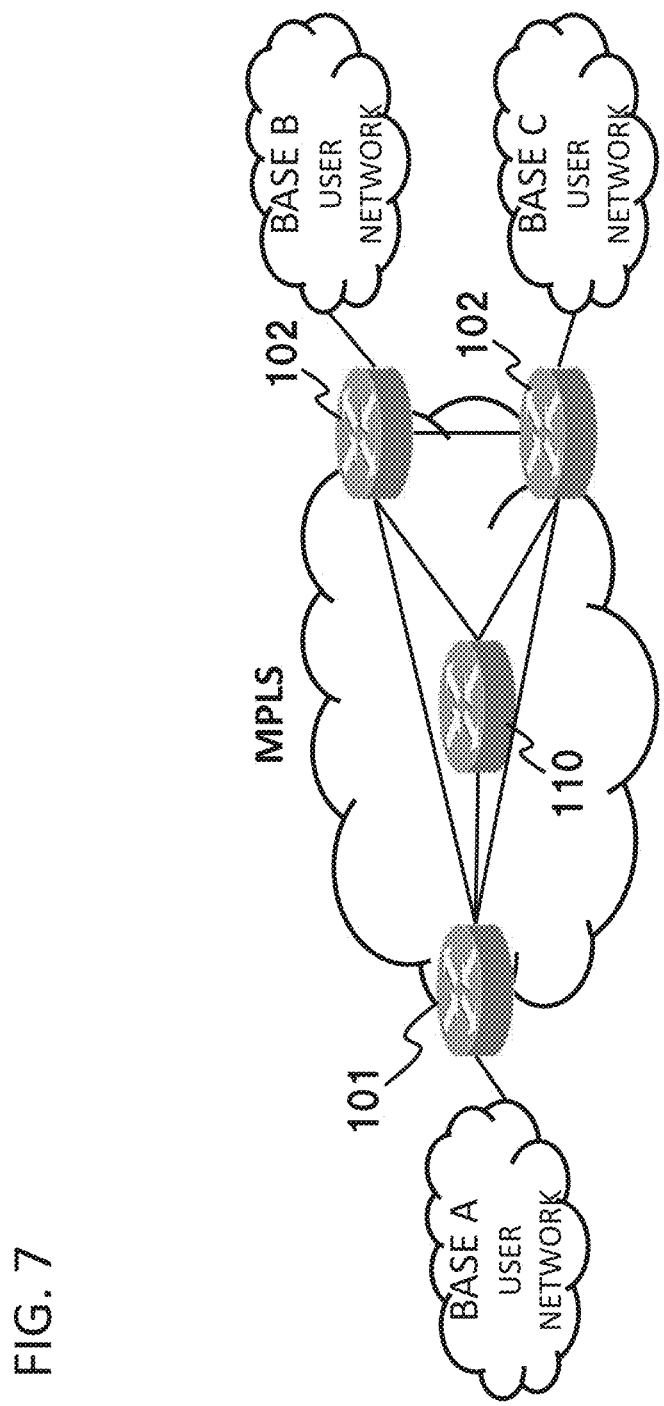
FIG. 7 is a drawing illustrating the configuration of a communication system of a first exemplary embodiment of the present disclosure.

Next, a first exemplary embodiment, in which the present disclosure is applied to a transport network that forwards packets using MPLS, will be described in detail with reference to the drawings. FIG. 7 is a drawing showing the configuration of a communication system of the first exemplary embodiment of the present disclosure. FIG. 7 shows an MPLS network that includes an ingress router 101, two egress routers 102, and a core router 110, and bases A to C connected to the MPLS network. Note that "frame" used as a unit of data transmission in layer 2 is referred to as "packet" in the description below.

When receiving a broadcast packet, unknown packet, or multicast packet (referred to as "BUM (Broadcast, Unknown unicast, Multicast) packet" hereinafter) sent from a user network at the base A to the bases B and C, the ingress router 101 adds a predetermined label for BUM packets and sends the packet to the MPLS network. Note that the ingress router 101 corresponds to the first edge node in the description above.

The core router 110 forwards the packet on the basis of the label added to each packet such as a BUM packet. Note that the core router 110 corresponds to the forwarding node in the description above.

When receiving the BUM packet sent from the user network at the base A to the bases B and C, the egress router 102 selects a return path from a plurality of learning path candidates on the basis of information (identifier), added in the label, indicating the transmission source router and learns the path. Note that the egress router 102 corresponds to the second edge node in the description above.

Figure 8:
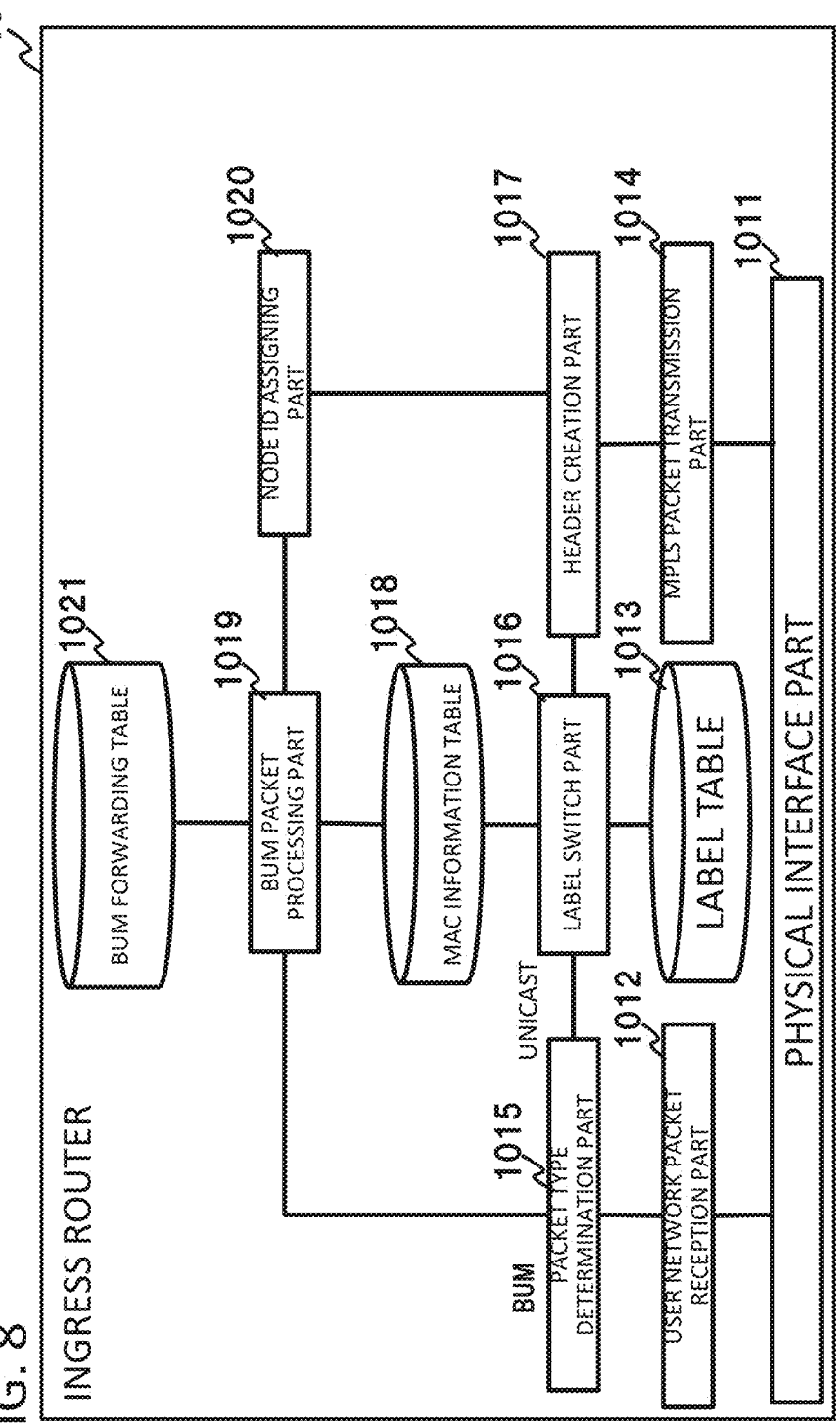
FIG. 8 is a drawing illustrating the configuration of an ingress router of the first exemplary embodiment of the present disclosure.

Next, the configuration of the ingress router 101 will be described with reference to the drawings. FIG. 8 is a drawing showing the configuration of the ingress router 101 of the first exemplary embodiment of the present disclosure. FIG. 8 shows a configuration that comprises a physical interface part 1011, a user network packet reception part 1012, a label table 1013, an MPLS packet transmission part 1014, a packet type determination part 1015, a label switch part 1016, a header creation part 1017, a MAC information table 1018, a BUM packet processing part 1019, a node ID assigning part 1020, and a BUM forwarding table 1021.

The physical interface part 1011 outputs a received frame to the user network packet reception part 1012 or sends an MPLS packet received from the MPLS packet transmission part 1014 to the MPLS network.

The user network packet reception part 1012 outputs the packet received from the physical interface part 1011 to the packet type determination part 1015, which determines whether or not the received packet is a BUM packet on the basis of the destination MAC address of the received packet.

When the received packet is not a BUM packet, the received packet is outputted to the label switch part 1016, which refers to the label table 1013, adds a label to the packet, and outputs the packet to the header creation part 1017. As for the configurations of the label table 1013 and the label switch part 1016, what is standardized in MPLS-TP, etc., can be used, in addition to the method described in Patent Literature 1. Further, the label switch part 1016 updates the MAC information table 1018 using the transmission source MAC address of the received packet and a receive interface (receive port) of the physical interface part.

On the other hand, when the packet type determination part 1015 determines that the received packet is a BUM packet, the received packet is outputted to the BUM packet processing part 1019, which refers to the BUM forwarding table 1021, adds a BUM packet label to the packet, and outputs the packet to the node ID assigning part 1020 along with output interface information specified in the BUM forwarding table 1021. Further, when a plurality of output ports are set in the BUM forwarding table 1021, the BUM packet processing part 1019 duplicates (copies) the packet. Further, the BUM packet processing part 1019 updates the MAC information table 1018 using the transmission source MAC address of the received BUM packet and the receive interface (receive port) of the physical interface part.

Figure 9:
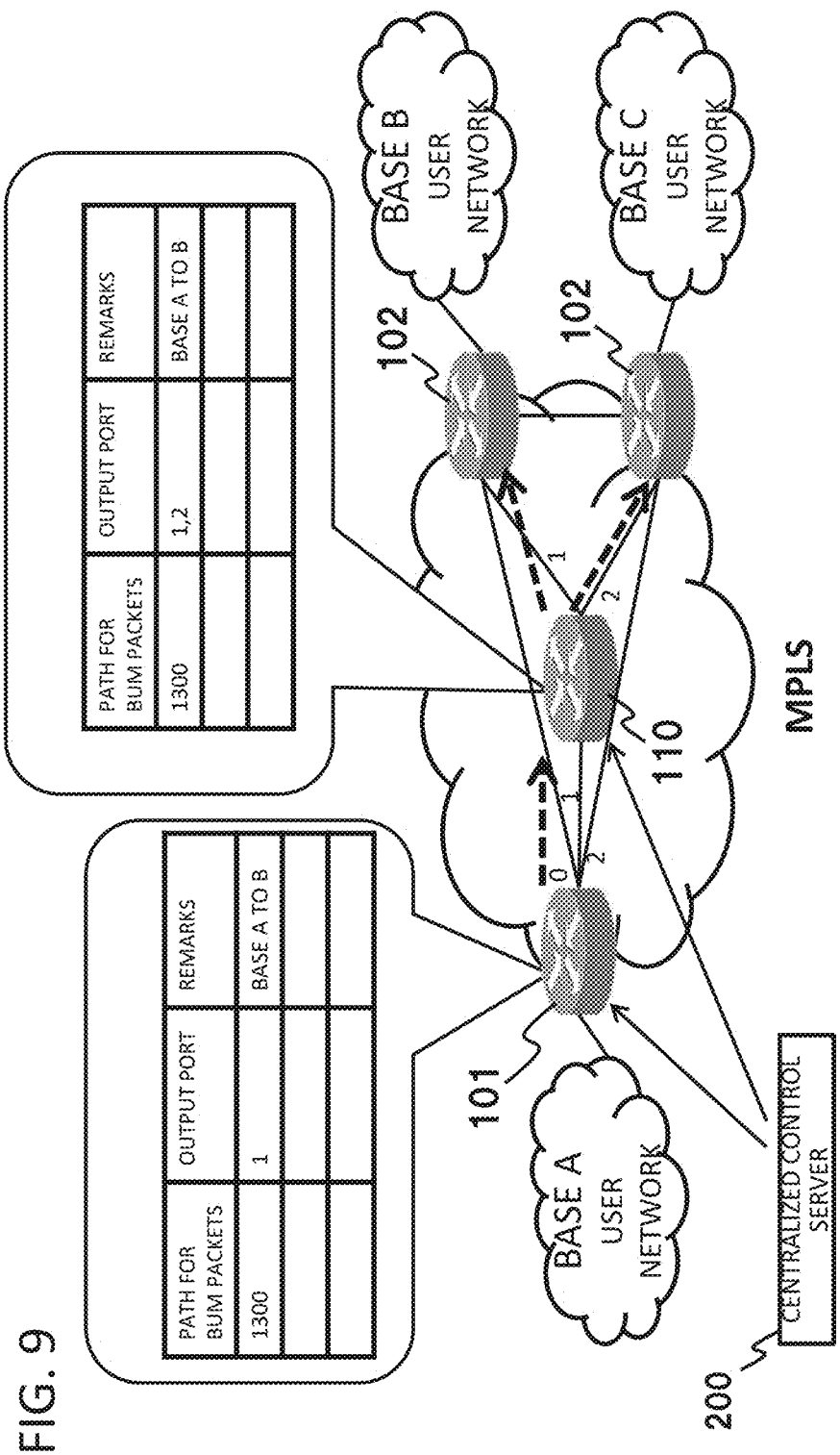
FIG. 9 is a drawing for explaining a path for BUM packets used in the first exemplary embodiment of the present disclosure.

The BUM packet label will be described. FIG. 9 is a drawing showing an example of a path for BUM packets configured in the MPLS network shown in FIG. 7. In the example of FIG. 9, when a packet from the base A is broadcast to the bases B and C, a path 1300 that duplicates the packet using the core router 110, not the ingress router 101, and forwards it to the egress router 102 is configured. The ingress router 101 forwards the received packet along the path for BUM packets by adding a label to the received packet instructing it to be forwarded along the path 1300. Consequently, the amount of packet duplication performed by the ingress router 101 is reduced, decreasing network load and traffic, as in Patent Literature 1. Note that the label table 1013 and the BUM forwarding table 1021 of each router may be set by, for instance, a centralized control server 200 shown in the lower part of FIG. 9.

The node ID assigning part 1020 adds a node ID uniquely identifying an ingress router to the packet received from the BUM packet processing part 1019 and outputs the packet to the header creation part 1017.

The header creation part 1017 creates a header for a packet to be transmitted to the MPLS network on the basis of the packet received from the label switch part 1016 or the node ID assigning part 1020. (a) in FIG. 10 shows a unicast packet created on the basis of a packet outputted by the label switch part 1016. (b) in FIG. 10 shows a BUM packet created on the basis of a packet outputted by the node ID assigning part 1020. The BUM packet differs from the unicast packet in that an outer label in two MPLS labels is a label indicating that it is a BUM packet and that a node ID is stored in an inner label.

The MPLS packet transmission part 1014 sends an MPLS packet, to which the header created by the header creation part 1017 for the received packet is added, to the MPLS network via an output interface specified in the BUM forwarding table 1021 of the physical interface part 1011.

Figure 11:
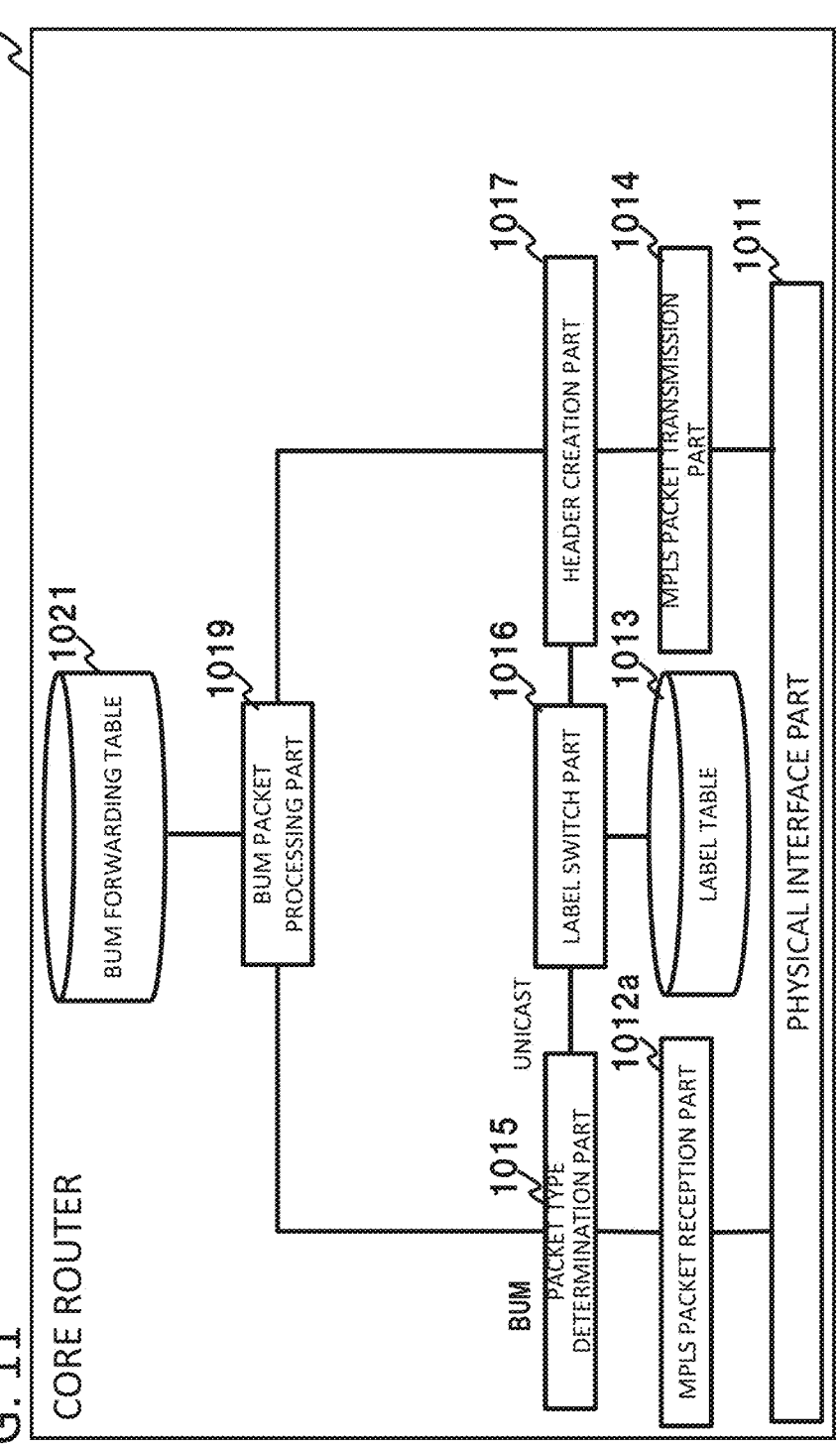
FIG. 11 is a drawing illustrating the configuration of a core router of the first exemplary embodiment of the present disclosure.

Next, the configuration of the core router 110 will be described with reference to the drawings. FIG. 11 is a drawing showing the configuration of the core router of the first exemplary embodiment of the present disclosure. The basic functions are the same as those of the ingress router 101, but the core router differs from the ingress router in that the MAC information table is omitted since it is unnecessary to learn a MAC address, the user network packet reception part becomes an MPLS packet reception part 1012a, and that the node ID assigning part 1020 is omitted. Since the other function blocks having the same reference signs as the ingress router 101 are identical to those in the ingress router 101, the explanation will be omitted.

Note that, although the packet type determination part 1015 is provided to process BUM packets and other packets separately in the examples of FIGS. 8 and 11, a configuration in which the label switch part 1016 and the BUM packet processing part 1019 are integrated may be employed since the basic operation of referring to the forward table and the label table 1013 and adding and changing labels is the same.

Further, the basic functions of the ingress router 101 and the core router 110 are the same as those of the ingress router and relay router of Patent Literature 1. Therefore, provided that the specifications of the egress router 102 described below are adjusted accordingly, the ingress router and relay router of Patent Literature 1 may be used instead of the ingress router 101 and the core router 110.

Figure 12:
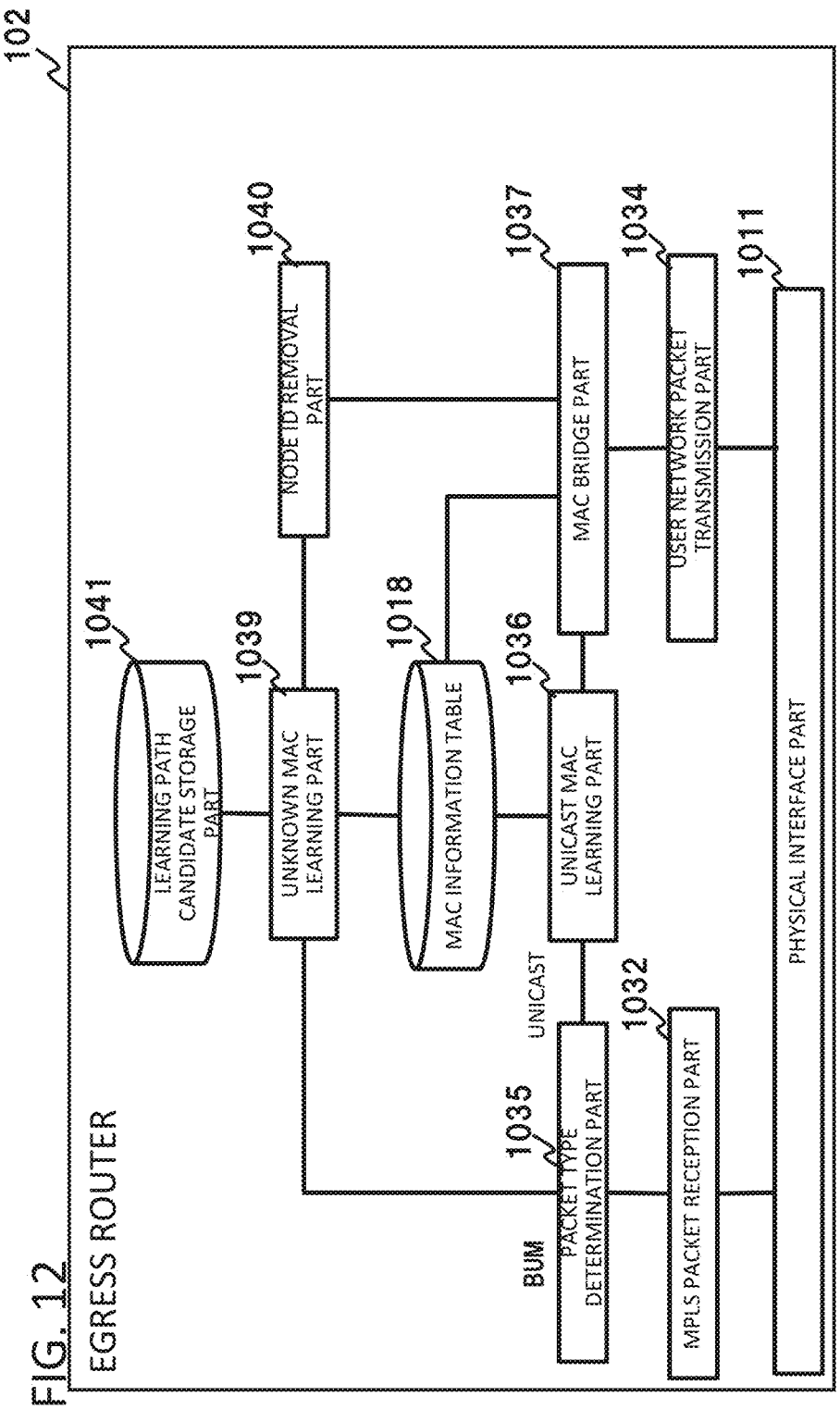
FIG. 12 is a drawing illustrating the configuration of an egress router of the first exemplary embodiment of the present disclosure.

Next, the configuration of the egress router 102 will be described with reference to the drawings. FIG. 12 is a drawing showing the configuration of the egress router of the first exemplary embodiment of the present disclosure. FIG. 12 shows a configuration that comprises the physical interface part 1011, an MPLS packet reception part 1032, a user network packet transmission part 1034, a packet type determination part 1035, a unicast MAC learning part 1036, a MAC bridge part 1037, the MAC information table 1018, an unknown MAC learning part 1039, a node ID removal part 1040, and a learning path candidate storage part 1041.

The physical interface part 1011 outputs a received frame to the MPLS packet reception part 1032 or sends a packet received from the user network packet transmission part 1034 to a user network.

The MPLS packet reception part 1032 outputs the packet received from the physical interface part 1011 to the packet type determination part 1035, which determines whether or not the received packet is a BUM packet on the basis of the destination MAC address and a label of the received MPLS packet.

When the received packet is not a BUM packet, the received MPLS packet is outputted to the unicast MAC learning part 1036, which refers to the header shown in (a) of FIG. 10, obtains an association between the transmission source MAC address of the received packet and the path used to forward this MPLS packet, and updates the MAC information table 1018. The unicast MAC learning part 1036 outputs the learned packet to the MAC bridge part 1037.

On the other hand, when the packet type determination part 1035 determines that the received packet is a BUM packet, the received packet is outputted to the unknown MAC learning part 1039, which refers to the header shown in (b) of FIG. 10, selects a learning path candidate from ones having matching node IDs among entries stored in the learning path candidate storage part 1041, and registers the path in association with the MAC address of the received packet in the MAC information table 1018. The unknown MAC learning part 1039 outputs the learned packet to the node ID removal part 1040.

FIG. 13 a drawing for explaining learning path candidates held in the learning path candidate storage part 1041. In the example of FIG. 13, two or more transmission paths (learning path candidates) are registered being associated with a single ingress node. Further, each path is prioritized in FIG. 13. The unknown MAC learning part 1039 of the present exemplary embodiment is able to select a path to learn on the basis of this degree of priority. The degree of priority may be determined on the basis of, for instance, the number of path hops (for instance the fewer hops a path has, the higher priority it is given) or the channel capacity of links constituting a path (higher priority is given to a path with a higher average value of bandwidth and traffic volume capacity).

Figure 14:
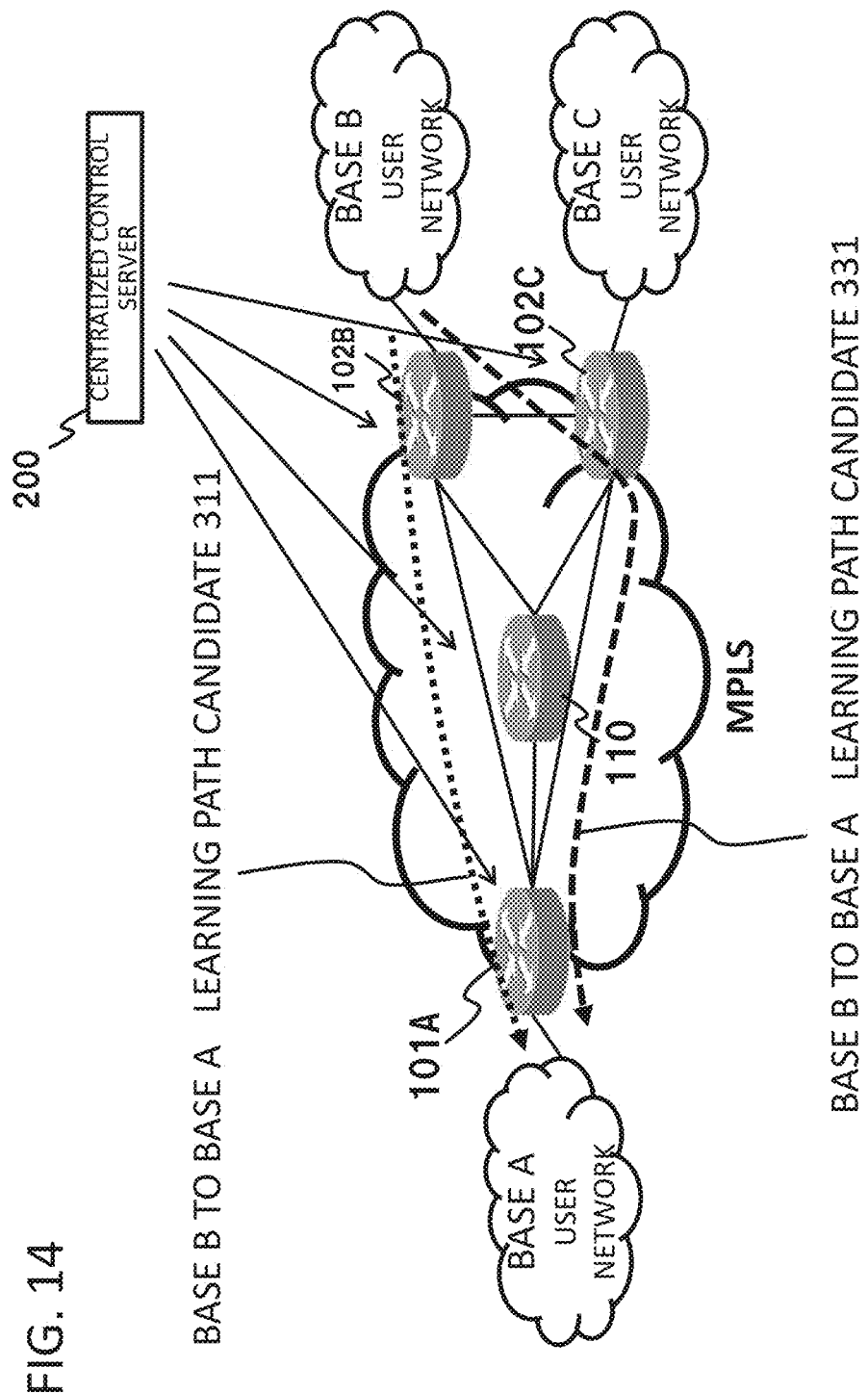
FIG. 14 is a drawing for explaining an example of a method for configuring a path configured in an MPLS network of the first exemplary embodiment of the present disclosure.

Further, the paths shown in FIG. 13 can be configured using, for instance, the centralized control server 200, as shown in FIG. 14. Alternatively, a method in which control messages are defined in advance and an entry to be set in the label table 1013 is individually transmitted to each router may be employed. Further, the centralized control server 200 may set entries (learning path candidates) to be held in the learning path candidate storage part 1041.

Figure 15:
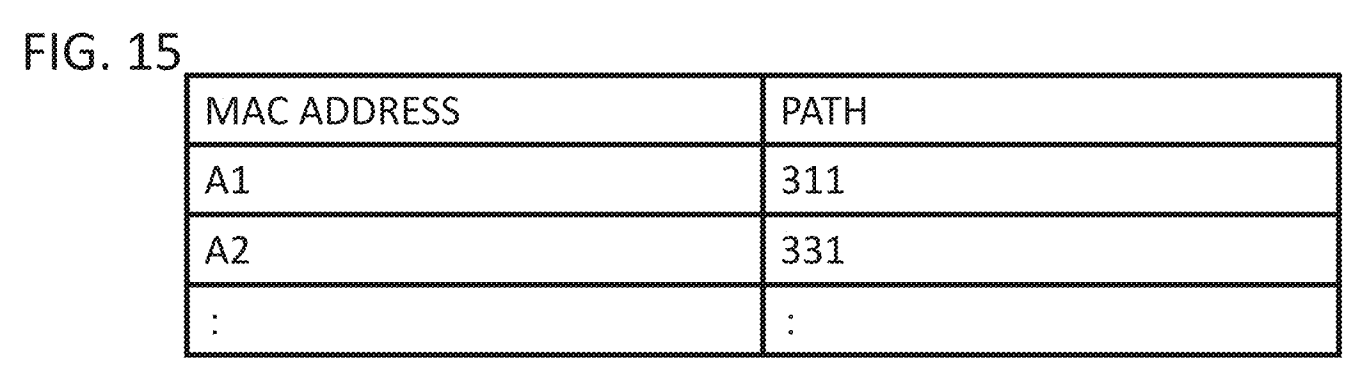

FIG. 15 shows the MAC information table 1018 in a state in which different paths are chosen for different users located in the base A using the learning path candidate storage part 1041 described above. For instance, a chosen path can be changed using the priority information in FIG. 14, and in the example of FIG. 15, a transmission path 311 is selected as the transmission path of a packet sent to a user having a MAC address A1 of the base A. Further, a transmission path 331 is selected as the transmission path of a packet sent to a user having a MAC address A2 of the base A in the example of FIG. 15. This realizes multipath forwarding of packets sent to the same base, as shown in FIG. 6.

The node ID removal part 1040 removes the label indicating that it is a BUM packet and a label storing the node ID from the BUM packet received from the unknown MAC learning part 1039 and then outputs the user packet, to which a L2 header is added, to the MAC bridge part 1037.

The MAC bridge part 1037 refers to the MAC information table 1018, determines the forwarding destination of the received packet, and instructs the user network packet transmission part 1034 to forward the packet.

The user network packet transmission part 1034 outputs the packet to a user network via an output interface specified by the MAC bridge part 1037 of the physical interface part 1011.

Figure 16:
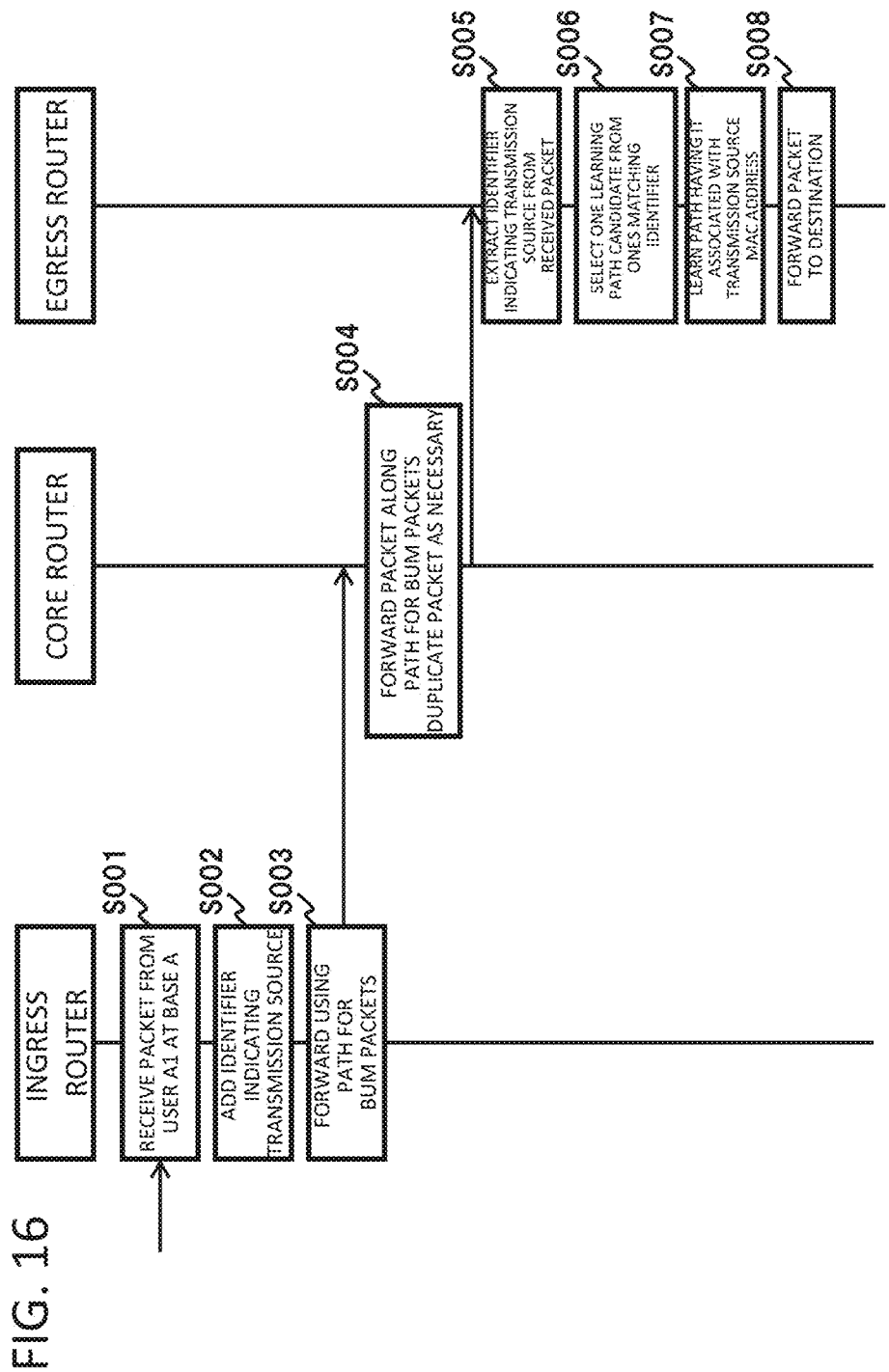
FIG. 16 is a sequence diagram showing the operation of the first exemplary embodiment of the present disclosure.

Next, the operation of the present exemplary embodiment will be described in detail with reference to the drawings. FIG. 16 is a sequence diagram showing the operation when a BUM packet is transmitted. In FIG. 16, first, when the ingress router 101 receives a packet from the user A1 at the base A (step S001), the ingress router 101 adds to the received packet a label indicating that it is a BUM packet and a label storing an identifier (node ID) that indicates the transmission source (step S002). Further, the ingress router 101 sends the received packet to the MPLS network using a path for BUM packets (step S003).

Having received the packet, the core router 110 forwards the packet along the path for BUM packets shown in FIG. 9 (step S004). At this time, the core router 110 duplicates the received packet as necessary.

Having received the packet forwarded by the core router 110, the egress router 102 extracts the identifier indicating the transmission source from the packet (step S005). Next, the egress router 102 selects an entry that matches the identifier indicating the transmission source from learning path candidates held in the learning path candidate storage part 1041 using the priority information (step S006), and learns the path in association with the transmission source MAC address (step S007). After the learning, the egress router 102 removes the header from the received packet and transmits it to the destination (step S008).

For instance, the egress router 102 selects the transmission path 311 having a priority degree of "1" from learning path candidates held in the learning path candidate storage part 1041 and learns the path. In this case, when receiving a packet addressed to the user A1, identified by the MAC address, thereafter, the egress router 102 forwards the packet using the transmission path 311. Further, the egress router 102 may then rewrite the priority information of learning path candidates held in the learning path candidate storage part 1041. Consequently, for instance, it becomes possible to have the egress router 102 that has received a packet from the user A2 thereafter select the transmission path 331 having its priority information rewritten to "1." As a result, it becomes possible to use different paths for different users located in the same base A.

As described, according to the present exemplary embodiment, it becomes possible to have a plurality of transmission paths to a base for replies to BUM packets. The reason for this is that the learning path candidate storage part 1041 is provided in the egress router 102 so that different paths can be selected for different users located in the same base.

Second Exemplary Embodiment

Next, a second exemplary embodiment, in which the path learning method in the first exemplary embodiment is modified, will be described. In the second exemplary embodiment, the content of the learning path candidate storage part 1041 of the first exemplary embodiment and the method for selecting a path using that content are modified. Since the other configurations and operations are the same as those of the first exemplary embodiment, the differences will be mainly discussed below.

Figure 17:
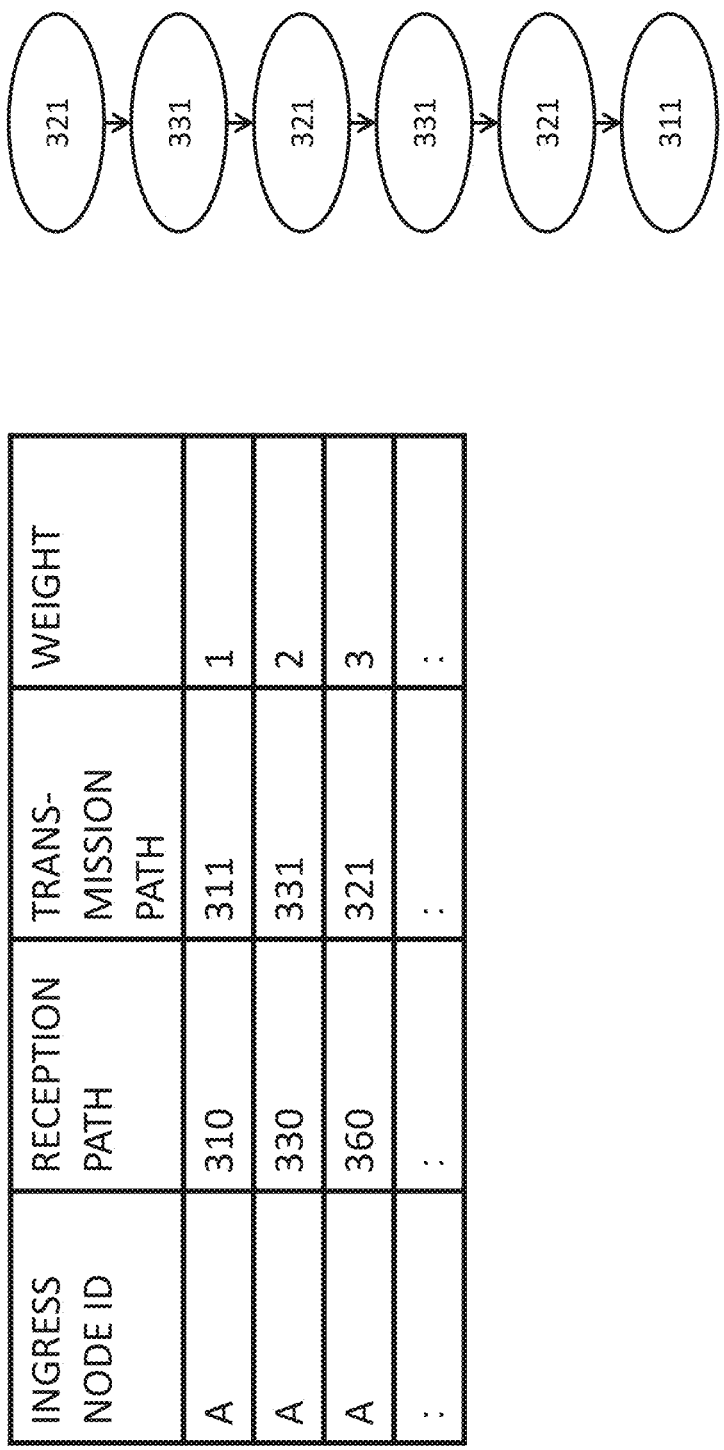
FIG. 17 is a drawing for explaining path information held in a learning path candidate storage part of an egress router of the second exemplary embodiment of the present invention disclosure and the path selection operation thereof.

FIG. 17 is a drawing for explaining path information held in the learning path candidate storage part 1041 of an egress router of the second exemplary embodiment of the present disclosure and the path selection operation thereof. In FIG. 17, instead of the priority information, weight information is provided in the learning path candidate storage part 1041 of the egress router of the second exemplary embodiment.

The egress router of the second exemplary embodiment selects a path to learn using this weight information. For instance, it is assumed that there are three paths 311, 331, and 321 as shown in FIG. 17, and each has a weight of 1, 2, and 3, respectively, (the greater the value, the more weight it has).

For instance, when paths are selected in a weighted round-robin fashion using this weight information, paths are evenly selected in the order of 321, 331, 321, 331, 321, 311, taking the weight into consideration, as shown on the right side of FIG. 17.

As described, according to the present exemplary embodiment, it becomes possible to weight each learning candidate path and distribute the load on each path. Further, the method for selecting a path is not limited to round robin, and various algorithms such as a method that selects a path using the weight information and a random number can be used.

Third Exemplary Embodiment

Next, a third exemplary embodiment, in which the method for updating priority in the first exemplary embodiment is modified, will be described. In the third exemplary embodiment, a mechanism for updating priority is added to the egress router of the first exemplary embodiment. Since the other configurations and operations are the same as those of the first exemplary embodiment, the differences will be mainly discussed below.

Figure 18:
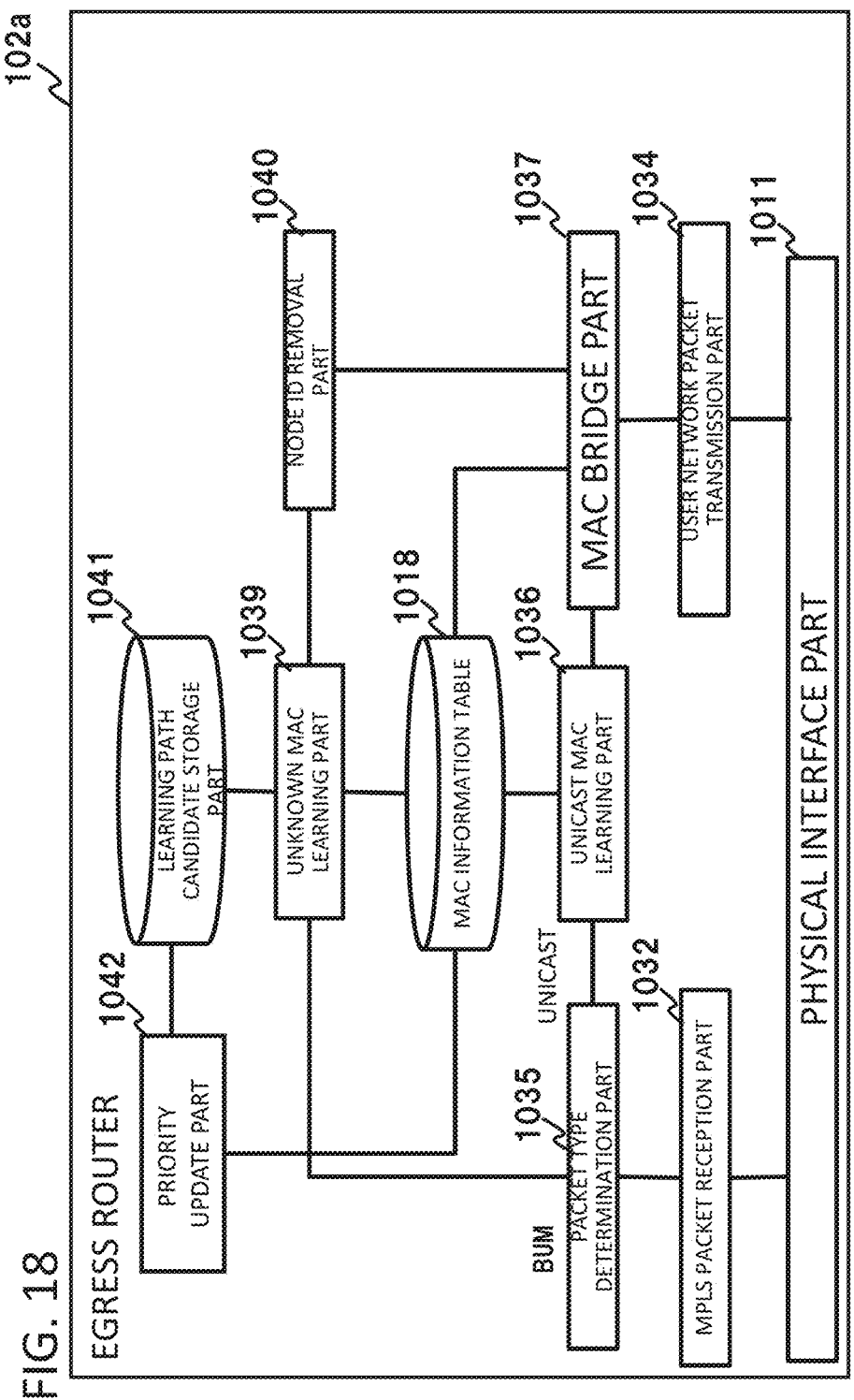
FIG. 18 is a drawing illustrating the configuration of an egress router of a third exemplary embodiment of the present invention.

FIG. 18 is a drawing showing the configuration of the egress router of the third exemplary embodiment of the present disclosure. This configuration differs from the egress router of the first exemplary embodiment shown in FIG. 12 in that a priority update part 1042 is added thereto.

The priority update part 1042 of the present exemplary embodiment refers to the MAC information table 1018 and updates the degrees of priority in the learning path candidate storage part 1041 according to the usage situation of learning path candidates destined for the same base. For instance, it is assumed that learning path candidates to the base A are the transmission paths 311 and 331 as shown in FIG. 14. When the transmission path 311 is used more than the transmission path 331 according to the MAC information table, the priority update part 1042 changes the degree of priority of the transmission path 311 from "1" to "2" and changes the degree of priority of the transmission path 331 from "2" to "1," thereby raising the priority of the transmission path 331 over the transmission path 311. As a result, the utilization rate of the transmission path 331 is improved thereafter, and leveling as a whole is achieved. As the utilization rate of a transmission path, in addition to the method in which the numbers of learning path candidates are compared as described above, the number of channels configurable in the path (the number of entries in the MAC information table), or the ratio of the number of channels already configured or connected terminals against the upper limit of connected terminals may be used.

Further, the degree of priority is changed on the basis of the usage situation of learning path candidates destined for the same base in the description above, however, the degree of priority can be changed using other pieces of information as a matter of course. For instance, even when the utilization rate of the transmission path 311 is high, the degree of priority does not have be immediately changed in a case where the channel capacity (bandwidth) thereof is high or much of the channel capacity (bandwidth) is available. Conversely, even when the utilization rate of the transmission path 311 is low, in a case where the channel capacity (bandwidth) thereof is low or much of the channel capacity (bandwidth) has been used (low availability), the degree of priority of the transmission path 331 may have to be increased. Furthermore, it is possible to change the degree of priority taking into account the load situation, etc., of the routers on the path, in addition to the channel capacity (bandwidth). As described, it is possible to have the priority update part 1042 change the degree of priority on the basis of at least one of the following: the usage situation of learning path candidates, the channel capacity (bandwidth), the availability of the channel capacity (bandwidth), and the load situation of the routers on the path.

As described, according to the present exemplary embodiment, it becomes possible to select a path to learn according to the actual situation. The reason for this is that the configuration that dynamically changes priority according to the path selection status, etc., is employed.

Fourth Exemplary Embodiment

Next, a fourth exemplary embodiment will be described; the information that the priority update part in the third exemplary embodiment refers to is modified in the fourth exemplary embodiment. Since the basic configuration and operation of the fourth exemplary embodiment are the same as those of the third exemplary embodiment, the differences will be mainly discussed below.

Figure 19:
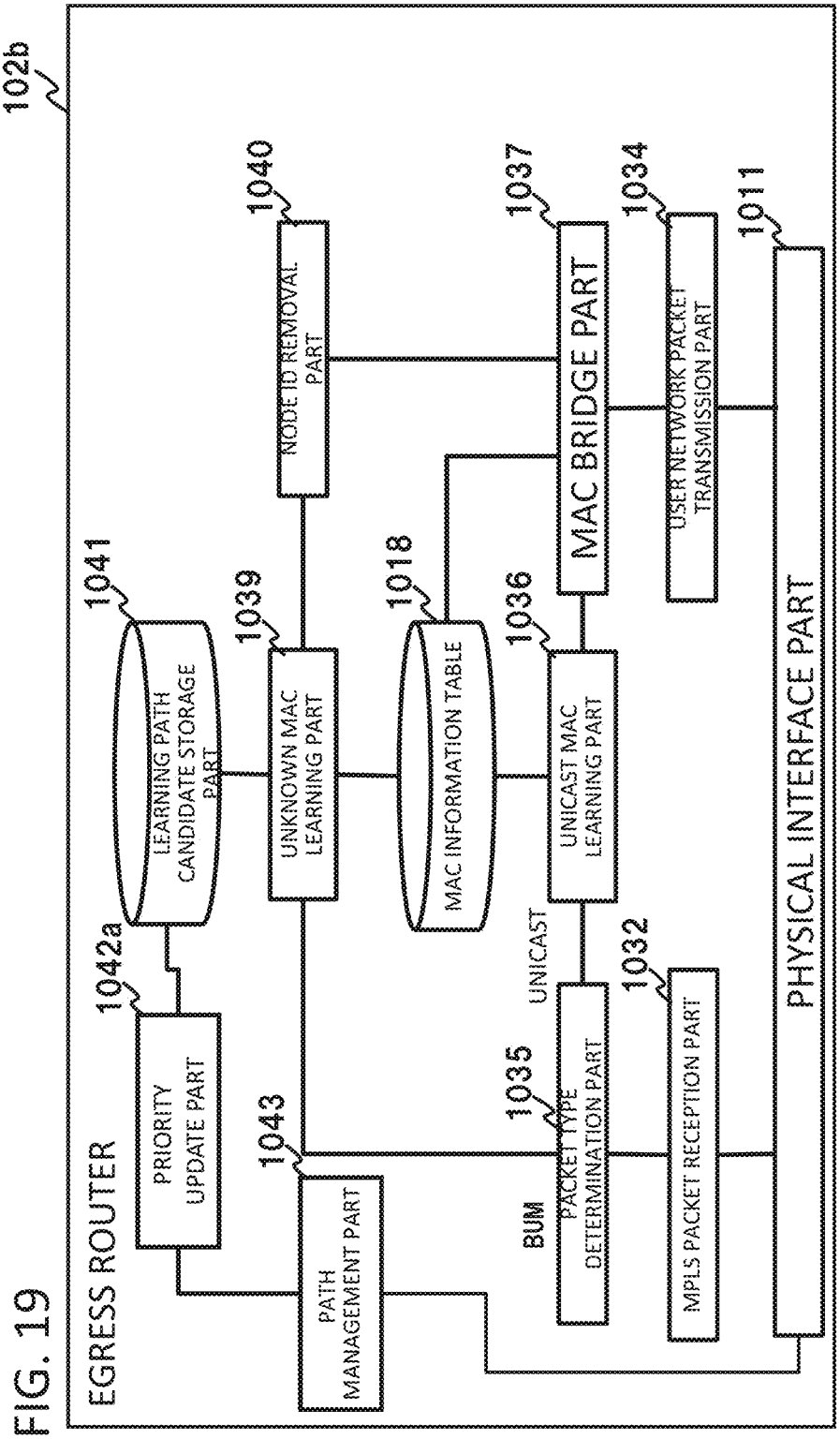
FIG. 19 is a drawing illustrating the configuration of an egress router of a fourth exemplary embodiment of the present invention.

FIG. 19 is a drawing showing the configuration of an egress router of the fourth exemplary embodiment of the present disclosure. This differs from the egress router of the third exemplary embodiment shown in FIG. 18 in that a path management part 1043 functioning as a link information collecting part that collects the utilization rate of a link constituting a path is added, and that a priority update part 1042a updates priority on the basis of the information of the path management part 1043.

The path management part 1043 of the fourth exemplary embodiment collects the utilization rate, etc., of a link constituting a path via the physical interface part 1011. The methods for collecting the link usage rate include a method using a routing protocol and a method using a centralized controller. Routing protocols, the former, include OSPF-TE (Open Shortest Path First-Traffic Engineering). Further, when a centralized controller is provided, the centralized controller may collect information using SNMP (Simple Network Management Protocol) or NetFlow (registered trademark), and the path management part 1043 may receive the collected information. Further, without employing these methods, the path management part 1043 may monitor the usage rate of a link connected to the egress router 102b and provide the information to the priority update part 1042a.

The priority update part 1042a refers to the information managed by the path management part 1043 and updates the degrees of priority in the learning path candidate storage part 1041 according to the utilization rate of links included in learning path candidates destined for the same base in the present exemplary embodiment as well. For instance, it is assumed that learning path candidates to the base A are the transmission paths 311 and 331 as shown in FIG. 14. The priority update part 1042a refers to the path management part 1043 and when the usage rate of links of the transmission path 311 is higher than the usage rate of links of the transmission path 331, the priority update part 1042a changes the degree of priority of the transmission path 311 from "1" to "2" and changes the degree of priority of the transmission path 331 from "2" to "1." Consequently, the transmission path 331 will have a higher degree of priority than the transmission path 311. As a result, the usage rate of links constituting the transmission path 331 is improved thereafter, and leveling as a whole is achieved.

Further, the degree of priority may be changed according to information other than the usage rate of a link constituting a path in the present exemplary embodiment as well. For instance, even when the usage rate of links constituting the transmission path 311 is high, the degree of priority does not have be immediately changed in a case where the channel capacity (bandwidth) thereof is high or much of the channel capacity (bandwidth) is available. Conversely, even when the usage rate of links constituting the transmission path 311 is low, in a case where the channel capacity (bandwidth) thereof is low or much of the channel capacity (bandwidth) has been used, the degree of priority of the transmission path 331 may have to be increased. Furthermore, it is possible to change the degree of priority taking into account the load situation, etc., of the routers on the path, in addition to the channel capacity (bandwidth), in the present exemplary embodiment as well.

Fifth Exemplary Embodiment

Figure 20:
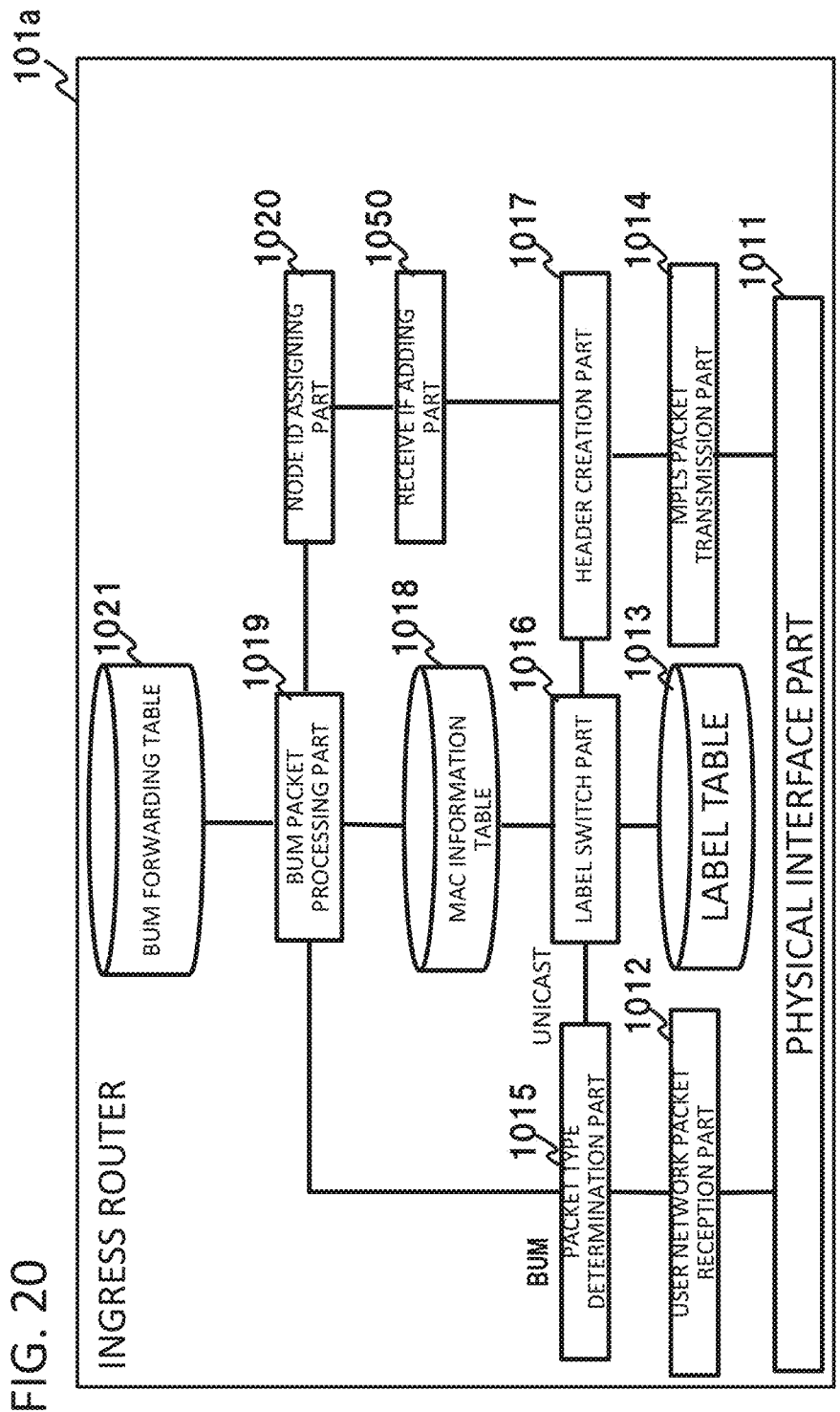
FIG. 20 is a drawing illustrating the configuration of an ingress router of a fifth exemplary embodiment of the present disclosure.

Next, a fifth exemplary embodiment, in which a path to learn (return path) can be specified from the transmission side, will be described. FIG. 20 is a drawing showing the configuration of an ingress router of the present exemplary embodiment. This differs from the ingress router 101 of the first exemplary embodiment shown in FIG. 8 in that a receive IF adding part 1050 that adds receive IF (interface) information after the node ID assigning part 1020 has assigned a note ID is added.

Figure 21:
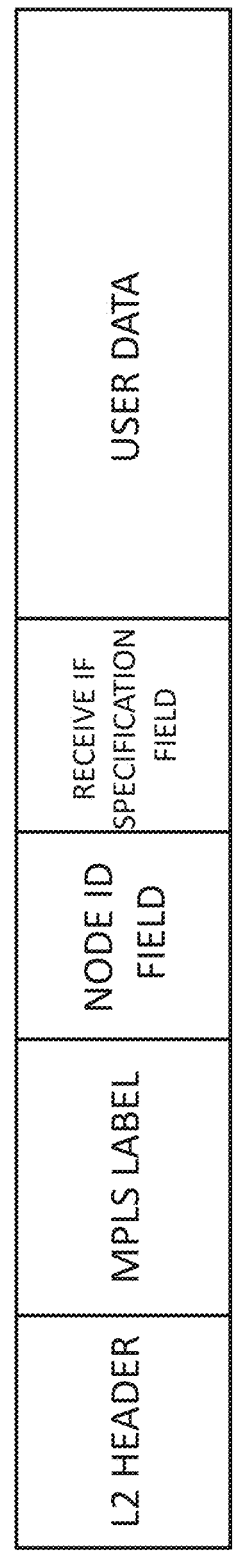
FIG. 21 is a drawing showing an example of a packet structure created by the ingress router of the fifth exemplary embodiment of the present disclosure.

FIG. 21 is a drawing showing a structural example of a packet that the receive IF adding part 1050 transmits to the MPLS network. This differs from the BUM packet shown in (b) of FIG. 10 in that a receive IF specification field is provided between a node ID field and user data.

The receive IF adding part 1050 of the ingress router 101a of the present exemplary embodiment adds a receive interface (such as a port number) determined on the basis of a predetermined rule to a BUM packet outputted by the node ID assigning part 1020, and sends the packet to the header creation part 1017. The rules used by the receive IF adding part 1050 to determine a receive interface include, for instance, a round-robin method, and a method that selects an interface corresponding to a path having a low usage rate in the MAC information table of the ingress router 101a.

Figure 22:
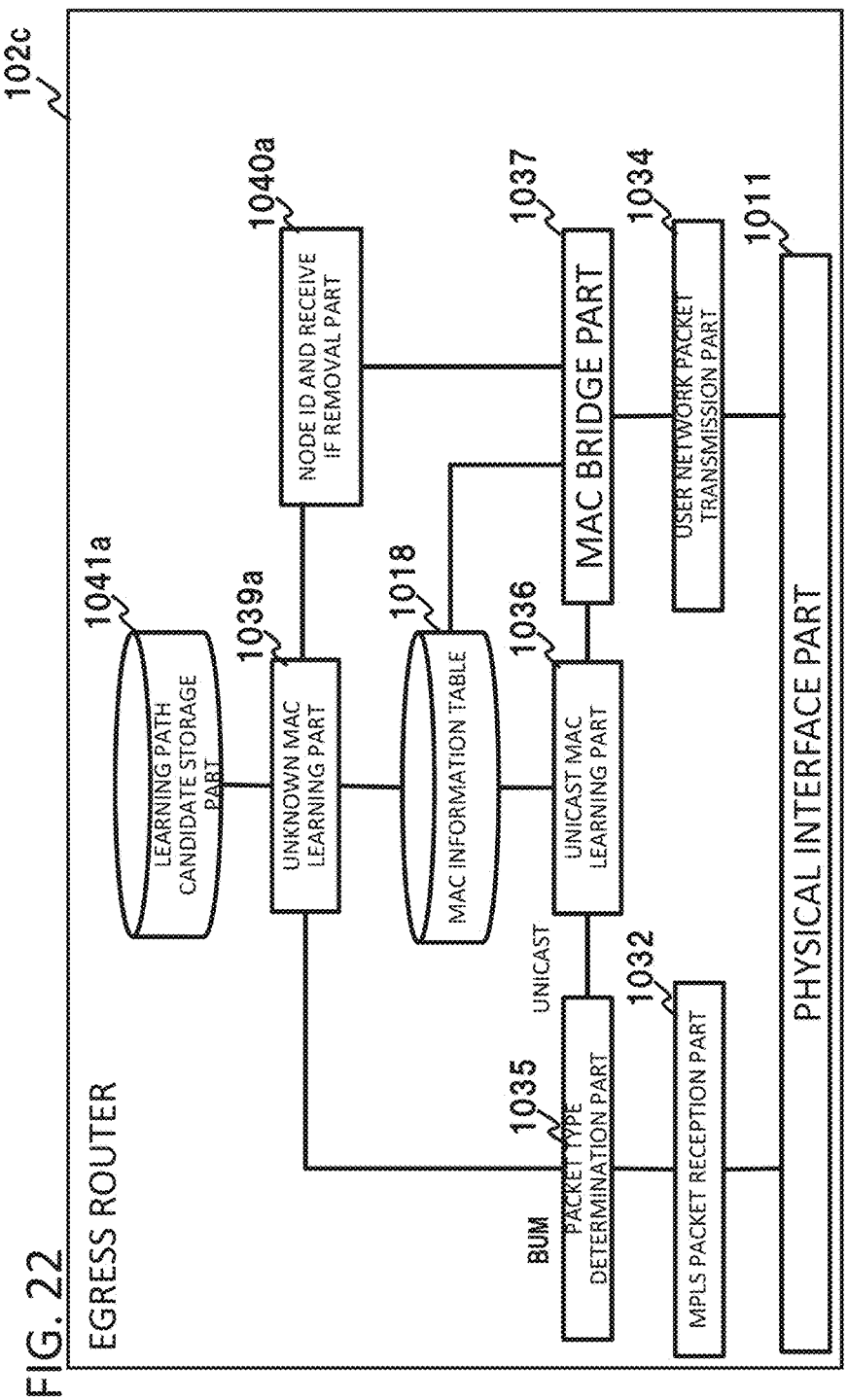
FIG. 22 is a drawing illustrating the configuration of an egress router of the fifth exemplary embodiment of the present disclosure.

FIG. 22 is a drawing showing the configuration of an egress router of the fifth exemplary embodiment of the present disclosure. This configurationally differs from the egress router of the first exemplary embodiment shown in FIG. 12 in that, instead of the degree of priority, a receive interface is set in a learning path candidate storage part 1041a, an unknown MAC learning part 1039a selects a path to learn on the basis of the receive interface, and that a node ID and receive IF removal part 1040a deletes the header including the node ID field and the receive IF specification field shown in FIG. 21.

FIG. 23 is a drawing showing an example of path information held in the learning path candidate storage part 1041a of the egress router of the present exemplary embodiment. This differs from the path information shown in FIG. 14 in that a receive interface field is provided instead of the degree of priority. For instance, when IF1 is set in the receive IF specification field of a packet received from the base A, the unknown MAC learning part 1039a of the present exemplary embodiment selects the transmission path 311. If IF2 is set in the receive IF specification field of a packet received from the base A, the unknown MAC learning part 1039a of the present exemplary embodiment will select the transmission path 331.

Figure 24:
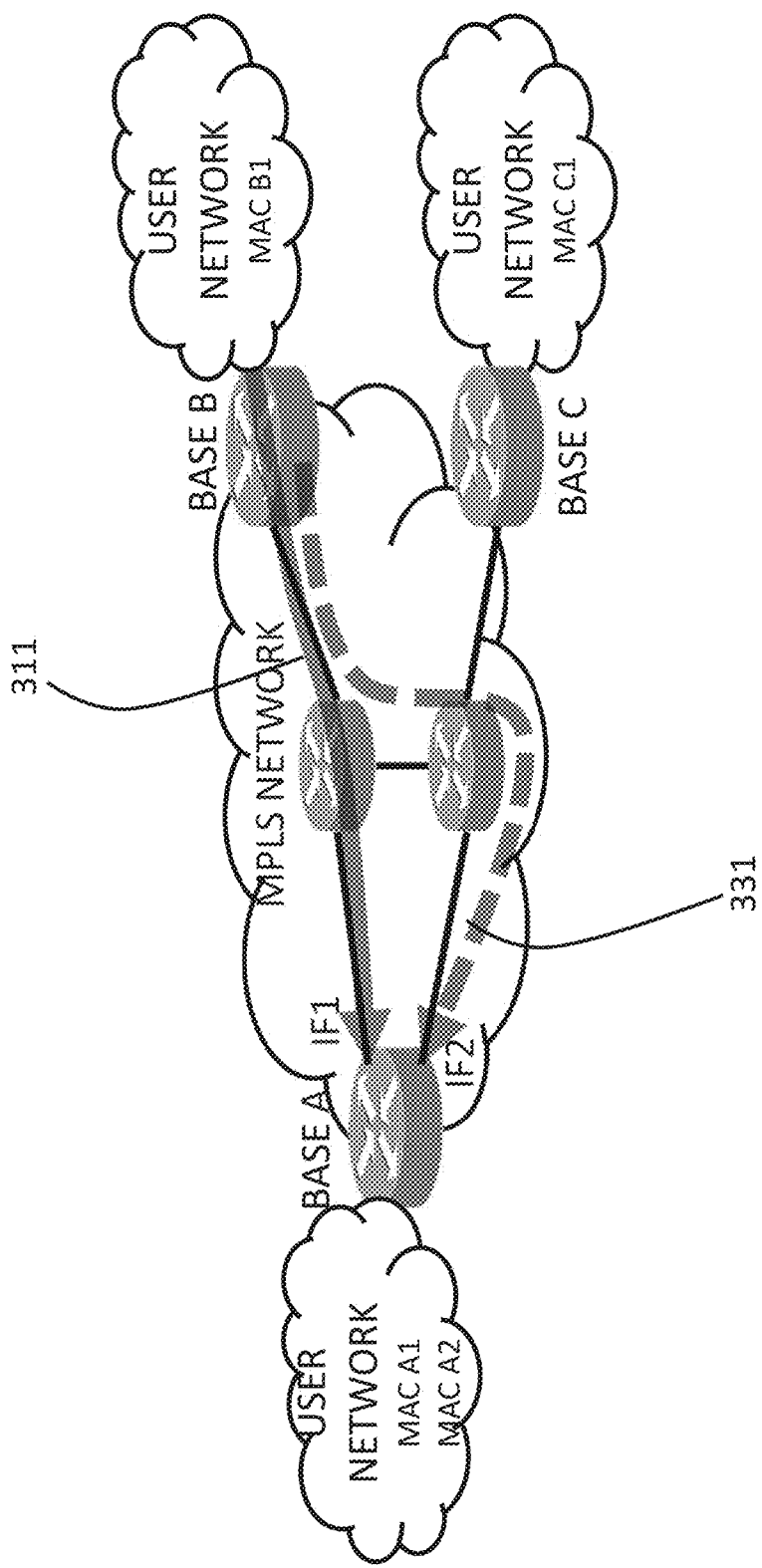
FIG. 24 is a drawing for explaining a path selection operation by the egress router of the fifth exemplary embodiment of the present disclosure.

For instance, when a BUM packet having IF1 as a specified receive IF is received from the user A1 at the base A as shown in FIG. 24, the unknown MAC learning part 1039a selects the path 311 associated with a receive interface 1 from learning path candidates having a matching node ID in the learning path candidate storage part 1041a.

Similarly, when a BUM packet having IF2 as a specified receive IF is received from another user A2 at the base A as shown in FIG. 24, the unknown MAC learning part 1039a selects the path 331 associated with a receive interface 2.

The operation after a path to learn has been selected is the same as in the first exemplary embodiment; after removing the header including the node ID and the receive interface from the BUM packet, the node ID and receive IF removal part 1040a outputs the packet to the MAC bridge part 1037.

As described, according to the present exemplary embodiment, a path to learn can be selected on the initiative of the transmission side.

Further, the egress router 102c selects a path having matching ingress node ID (node ID) and receive IF in the fifth exemplary embodiment described above, however, the exemplary embodiment may be modified so that a path is selected according to other combined pieces of information. For instance, the degree of priority may be set by adding receive interface to entries held in the learning path candidate storage part 1041a, as shown in FIG. 25. In this case, the unknown MAC learning part 1039a selects a path having the highest degree of priority from learning path candidates having matching node ID and receive IF in the learning path candidate storage part 1041a.

Further, there is a possibility that a path corresponding to the receive IF specified in the ingress node competes against a path selected on the basis of the degree of priority. In this case, an arbitration function that gives priority to either one may be provided in the egress router 102c. As a matter of course, a path to learn may be selected according to other combined pieces of information (path utilization rate, channel capacity (absolute value, availability, link usage rate), etc.) as in the first to the fourth exemplary embodiments.

Further, a receive interface of the ingress router is used as the information for specifying a path to learn (return path) in the fifth exemplary embodiment, however, other pieces of information may be used as long as the information is able to specify a path. For instance, instead of receive interface, link ID or virtual network information shared by the ingress router and the egress router in advance may be used.

While each exemplary embodiment of the present disclosure has been described, it is to be understood that the present invention is not limited to the exemplary embodiments above and that further modifications, replacements, and adjustments may be added without departing from the basic technical concept of the present invention. For instance, the network configuration, the configuration of each element, and the expression of each message shown in each drawing are examples to facilitate understanding of the present invention and are not limited to the configurations shown in the drawings.

Further, an MPLS label header is used as a header storing a node ID and a receive interface in the first to the fifth exemplary embodiments above, however, anything capable of storing a node ID and a receive interface that can be forwarded by a core node (core router) may be used. For instance, MAC-in-MAC or other encapsulation headers may be used to store a node ID and a receive interface.

For instance, each part (processing means) of each router shown in FIGS. 8, 11, 12, etc., may be implemented by a computer program causing a computer constituting these apparatuses to execute each processing described above using the hardware thereof. In this case, the storage parts and tables shown in FIGS. 8, 11, 12, etc., may be implemented by an auxiliary memory of the computer. Further, the other blocks of FIGS. 8, 11, 12, etc., may be implemented by a CPU (Central Processing Unit) that performs information processing using the information described above on the basis of a computer program prepared in advance.

Finally, preferred modes of the present invention will be summarized.

[Mode 1]
(Refer to the communication system according to the first aspect.)

[Mode 2]
The first edge node of the communication system may further comprise a path information storage part that stores the path selection information and a plurality of path candidates configured in advance between the first base and the second base, the path information storage part may hold priority information for each of the path candidates, and the path learning part may select a return path using the priority information.

[Mode 3]
The communication system may further comprise a path information update part that rewrites the priority information of the path information storage part on the basis of the utilization rate of or the availability of the channel capacity of each of the path candidates.

[Mode 4]
The communication system may further comprise a path information update part that rewrites the priority information of the path information storage part on the basis of the utilization rate of a link constituting the path candidate.

[Mode 5]
The communication system may further comprise a link information collection part that collects the utilization rate of a link constituting the path candidate from a device provided on the path candidate.

[Mode 6]
In the communication system, a higher degree of priority may be given to a path having fewer hops among path candidates having different numbers of path hops as the priority information.

[Mode 7]
The path learning part of the communication system may select a return path using a predetermined algorithm from path candidates selected on the basis of the path selection information.

[Mode 8]
The first edge node of the communication system may set an identifier of the first edge node and a receive interface or receive link as the path selection information, the identifier of the first edge node and the receive interface or receive link may be set for the plurality of path candidates in the path information storage part of the second edge node, and
the path learning part of the second edge node may select a return path using the path selection information, the identifier of the first edge node, and the receive interface or receive link, and learn the path in association with the information indicating the transmission source.

[Mode 9]
In the communication system, the path selection information may be stored in an MPLS label.

[Mode 10]
(Refer to the edge node according to the second aspect.)

[Mode 11]
(Refer to the communication method according to the third aspect.)

[Mode 12]
(Refer to the program according to the fourth aspect.)
Note that Modes 10 to 12 can be developed into Modes 2 to 9 as Mode 1.

Further, the disclosure of each Patent Literature cited above is incorporated herein in its entirety by reference thereto. It should be noted that other objects, features and aspects of the present invention will become apparent in the entire disclosure and that modifications may be done without departing the gist and scope of the present invention as disclosed herein and claimed as appended herewith. Also it should be noted that any combination of the disclosed and/or claimed elements, matters and/or items may fall under the modifications. Particularly, any numerical ranges disclosed herein should be interpreted that any intermediate values or subranges falling within the disclosed ranges are also concretely disclosed even without specific recital thereof.

REFERENCE SIGNS LIST

101, 101*a*: ingress router
101A: first edge node
102, 102*a* to 102*c*: egress router
102B, 102C: second edge node
103: forwarding node
110: core router
200: centralized control server
1011: physical interface part
1012: user network packet reception part
1012*a*: MPLS packet reception part
1013: label table
1014: MPLS packet transmission part
1015, 1035: packet type determination part
1016: label switch part
1017: header creation part
1018: MAC information table
1019: BUM packet processing part 1020: node ID assigning part
1021: BUM forwarding table
1032: MPLS packet reception part
1034: user network packet transmission part
1035: packet type determination part
1036: unicast MAC learning part
1037: MAC bridge part
1039, 1039a: unknown MAC learning part
1040: node ID removal part
1040a: node ID and receive IF removal part
1041, 1041a: learning path candidate storage part
1042, 1042a: priority update part
1043: path management part
1050: receive IF adding part

What is claimed is:

1. A communication system comprising:
a forwarding node, provided in a transport network, that forwards a packet between bases according to a path configured in advance;
a first edge node that, for a flooded packet transmitted from a first base to a second base connected to the transport network, first sets path selection information for selecting a return path for transmitting the packet from the second base to the first base, and then transmits the flooded packet to the second base via the path configured in advance; and
a second edge node that, when receiving the flooded packet, selects the return path on the basis of the path selection information from a plurality of path candidates configured in advance between the first base and the second base and learns the path in association with information indicating a transmission source, and transmits the packet addressed to the information indicating the transmission source via the return path, wherein
the first edge node stores the path selection information and the plurality of path candidates configured in advance between the first base and the second base, and holds priority information for each of the path candidates, the priority information used to select the return path,
wherein the first and the second bases are each a network comprising a plurality of terminals.

2. The communication system according to claim 1, wherein the first edge node rewrites the priority information on the basis of an utilization rate or a channel capacity availability of each of the path candidates.

3. The communication system according to claim 2, wherein the first edge node rewrites the priority information on the basis of the utilization rate of a link constituting one of the path candidates.

4. The communication system according to claim 2, wherein the first edge node gives a higher degree of priority to a path having fewer hops among path candidates having different numbers of path hops as the priority information.

5. The communication system according to claim 2, wherein the path selection information is stored in an MPLS label.

6. The communication system according to claim 1, wherein the first edge node rewrites the priority information on the basis of an utilization rate of a link constituting one of the path candidates.

7. The communication system according to claim 6, wherein the first edge node collects the utilization rate of the link from a device provided on the link.

8. The communication system according to claim 7, wherein the first edge node gives a higher degree of priority to a path having fewer hops among path candidates having different numbers of path hops as the priority information.

9. The communication system according to claim 6, wherein the first edge node gives a higher degree of priority to a path having fewer hops among path candidates having different numbers of path hops as the priority information.

10. The communication system according to claim 6, wherein the path selection information is stored in an MPLS label.

11. The communication system according to claim 1, wherein the first edge node gives a higher degree of priority to a path having fewer hops among path candidates having different numbers of path hops as the priority information.

12. The communication system according to claim 1, wherein
the first edge node selects the return path using a predetermined algorithm from path candidates selected on the basis of the path selection information.

13. The communication system according to claim 1, wherein
the first edge node sets an identifier of the first edge node and a receive interface or receive link as the path selection information,
the identifier of the first edge node and the receive interface or receive link are set for the path candidates in the second edge node, and
the second edge node selects the return path using the path selection information, the identifier of the first edge node, and the receive interface or receive link, and learns the path in association with the information indicating the transmission source.

14. The communication system according to claim 1, wherein the path selection information is stored in an MPLS label.

15. An edge node connected to a transport network constituted by a forwarding node that forwards a packet between bases according to a path configured in advance, the edge node comprising:
a processor; and
a memory storing instructions executable by the processor to:
when receiving a flooded packet in which path selection information for selecting a return path for transmitting the packet from a second base to a first base is set, select a particular return path on the basis of the path selection information from a plurality of path candidates configured in advance between the first base and the second base and learns the path in association with information indicating a transmission source;
transmit the packet addressed to the information indicating the transmission source via the particular return path;
store the path selection information and the plurality of path candidates configured in advance between the first base and the second base;
hold priority information for each of the path candidates, the particular return path selected using the priority information,
wherein the first and the second bases are each a network comprising a plurality of terminals.

16. The edge node according to claim 15, wherein
the flooded packet further has an identifier of a first edge node and a receive interface or receive link set therein as the path selection information,
the identifier of the first edge node and the receive interface or receive link are set for the path candidates, and the edge node selects the particular return path on the basis of the path selection information using the identifier of the first edge node and the receive interface or receive link, and learns the path in association with the information indicating the transmission source.

17. A communication method including:
a step of causing an edge node connected to a transport network constituted by a forwarding node that forwards a packet between bases according to a path configured in advance to select a return path on the basis of path selection information for selecting the return path for transmitting the packet from a second base to a first base from a plurality of path candidates configured in advance between the first base and the second base when receiving a flooded packet in which the path selection information is set, and to learn the path in association with information indicating a transmission source; and
a step of causing the edge node to transmit the packet addressed to the information indicating the transmission source via the return path, wherein
the edge node stores the path selection information and the plurality of path candidates configured in advance between the first base and the second base, and holds priority information for each of the path candidates, the return path selected using the priority information,
wherein the first and the second bases are each a network comprising a plurality of terminals.

18. A non-transitory computer-readable recording medium storing thereon a program causing a computer that constitutes an edge node connected to a transport network constituted by a forwarding node that forwards a packet between bases according to a path configured in advance to execute:
a process of selecting a return path on the basis of path selection information for selecting the return path for transmitting the packet from a second base to a first base from a plurality of path candidates configured in advance between the first base and the second base when receiving a flooded packet in which the path selection information is set, and of learning the path in association with information indicating a transmission source, wherein
the edge node stores the path selection information and the plurality of path candidates configured in advance between the first base and the second base, and holds priority information for each of the path candidates, the return path selected using the priority information,
wherein the first and the second bases are each a network comprising a plurality of terminals.

* * * * *